(12) United States Patent
Mohan et al.

(10) Patent No.: US 11,211,700 B1
(45) Date of Patent: Dec. 28, 2021

(54) DYNAMIC NOISE CANCELLATION USING NOISE PATTERNS

(71) Applicant: Amazon Technologies, Inc., Seattle, WA (US)

(72) Inventors: Akshay Mohan, San Jose, CA (US); Yue Zheng, Santa Clara, CA (US); Deepak Pai Hosadurga, Santa Clara, CA (US); Jagan Vaidyanathan Rajagopalan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/298,723

(22) Filed: Mar. 11, 2019

(51) Int. Cl.
  *G05B 19/04* (2006.01)
  *H01Q 3/08* (2006.01)
  *H01Q 1/32* (2006.01)
  *B25J 13/00* (2006.01)
  *B25J 9/16* (2006.01)

(52) U.S. Cl.
  CPC .............. *H01Q 3/08* (2013.01); *B25J 9/161* (2013.01); *B25J 13/006* (2013.01); *H01Q 1/32* (2013.01)

(58) Field of Classification Search
  CPC .... H01Q 3/08; H01Q 1/32; B25J 9/161; B25J 13/006
  See application file for complete search history.

(56) References Cited

U.S. PATENT DOCUMENTS

| | | | | |
|---|---|---|---|---|
| 5,621,199 A | * | 4/1997 | Calari | G06K 7/10316 235/375 |
| 6,574,460 B1 | * | 6/2003 | Lindenmeier | H01Q 1/32 342/359 |
| 6,611,677 B1 | * | 8/2003 | Lindenmeier | H04B 7/0808 455/135 |
| 10,432,331 B1 | * | 10/2019 | Lo | H04B 17/23 |
| 2006/0231693 A1 | * | 10/2006 | Lin | H01Q 1/1207 248/121 |
| 2017/0117608 A1 | * | 4/2017 | Bologna | G06F 1/1681 |
| 2017/0288295 A1 | * | 10/2017 | Sultenfuss | H01Q 21/28 |
| 2019/0181564 A1 | * | 6/2019 | Kwon | H01Q 9/42 |
| 2019/0319724 A1 | * | 10/2019 | Cordone | H04B 17/345 |

* cited by examiner

*Primary Examiner* — Harry Y Oh
(74) *Attorney, Agent, or Firm* — Lowenstein Sandler LLP

(57) ABSTRACT

Technologies for dynamic noise cancelation using noise patterns are described. One device includes a moveable assembly having first and second degrees of freedom. A component within the base assembly radiates electromagnetic energy in a radiation pattern as a noise source when operating and an antenna, coupled to a receiver, is disposed on the support member. The processing device, using noise profile data about the radiation pattern of the noise source, determines that the component is operating and a current angle between the component and the antenna. The processing device determines a difference value between the current angle and the first angle and causes the moveable assembly to move at least one of the antenna or the base assembly according to the difference value.

22 Claims, 10 Drawing Sheets

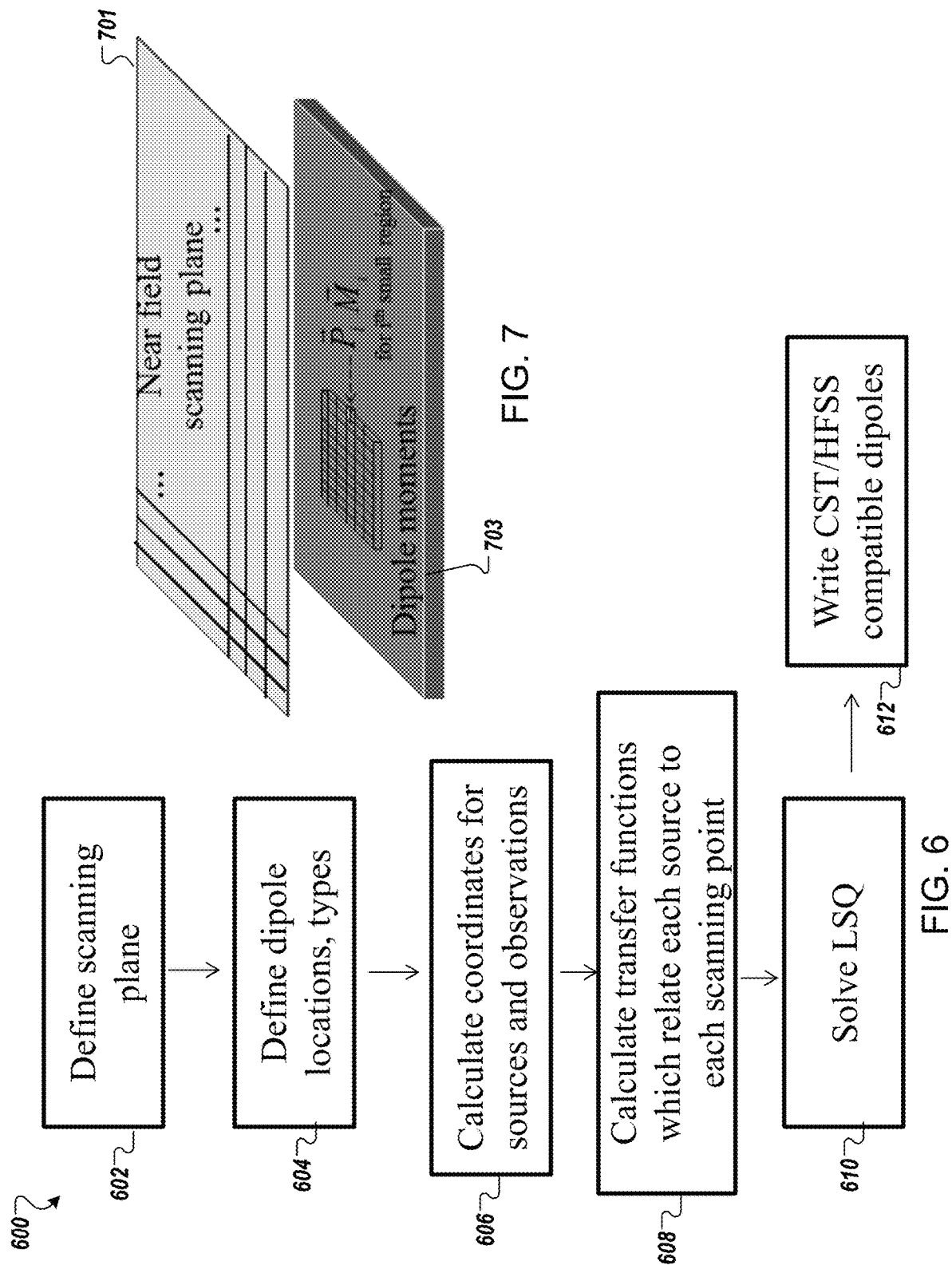

DYNAMIC NOISE CANCELLATION USING NOISE PATTERNS

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF DRAWINGS

The present embodiments will be understood more fully from the detailed description given below and from the accompanying drawings of the present disclosure, which, however, should not be taken to limit the present embodiments, but are for explanation and understanding only.

FIG. 6 is a flow diagram of a method for generating a dipole moment model of the noise source radiation pattern of FIG. 5 according to one embodiment.

FIG. 7 illustrates a near field scanning plane and corresponding dipole moments for modeling the noise source radiation pattern of FIG. 5 according to one embodiment.

DETAILED DESCRIPTION

Figure 1A:
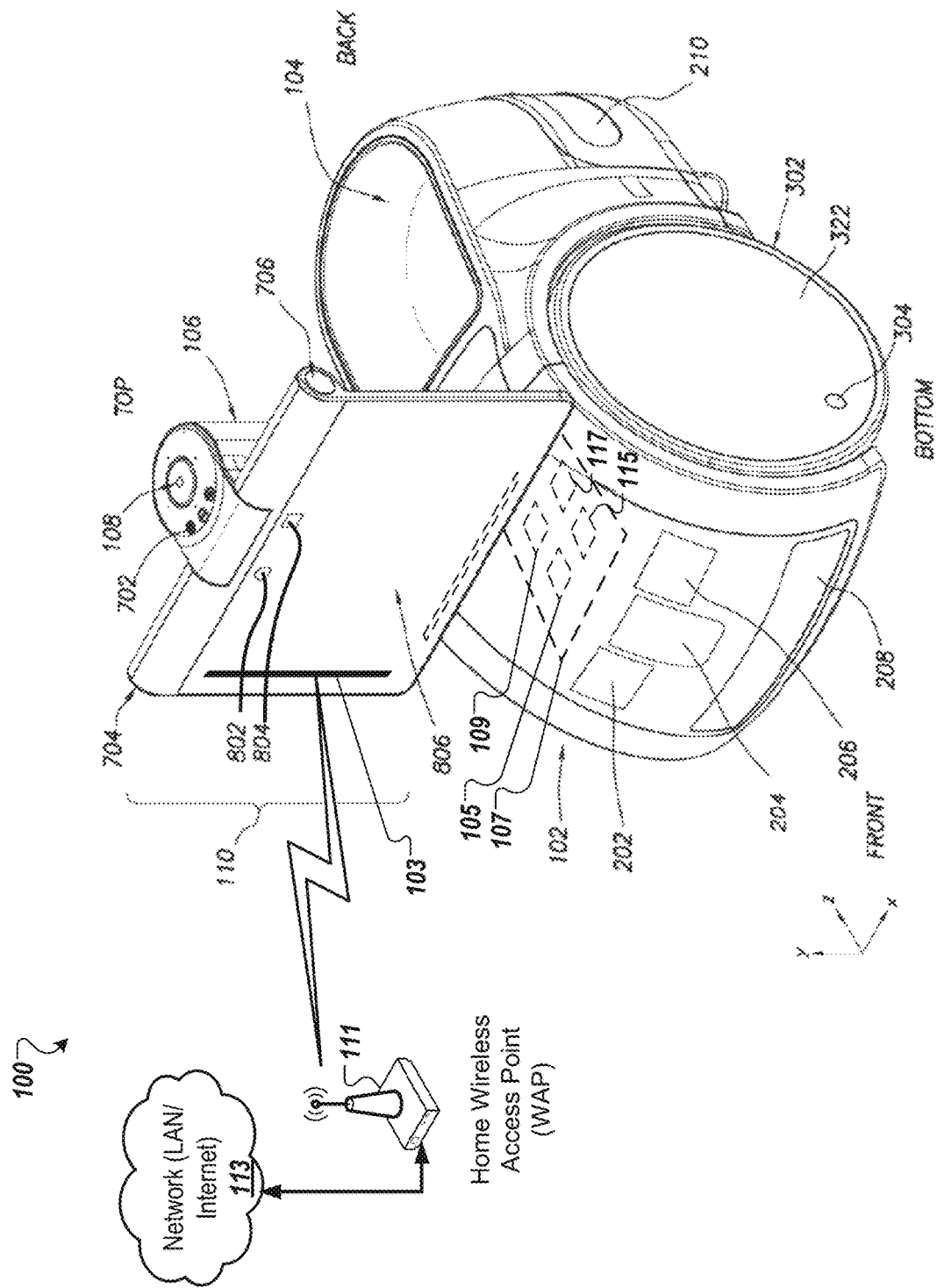
FIG. 1A illustrates a perspective view of an autonomous mobile device, such as a robot, which includes an antenna disposed on a display assembly and a component disposed in the autonomous mobile device that produces noise according to one embodiment.

Technologies for dynamic noise cancelation using noise patterns are described. In particular, the field distributions from noise sources can be simulated or measured and modeled to indicate nulls in the radiation patterns or reverse fields where less noise is received by an antenna from a noise source. Noise sources can be connectors, integrated circuits disposed on a printed circuit board (PCB), conductive traces of the PCB, transmission lines, high-speed interconnects, hard drives, cameras, displays, memory devices, peripheral devices, a cable, a flexible printed circuit board (PCB), or the like. Conventionally, these noise sources are shielded from antennas or antennas are disposed in locations where the effect of the noise sources is less than other locations.

The embodiments described herein can store noise profile data about the radiation patterns from these noise sources and move the antenna, the noise source, or both using one or more motors to improve "desense" by a receiver coupled to the antenna. "Desense" is the degradation in sensitivity due to noise source. The embodiments described herein take advantage of the fact that the radiation patterns of these noise sources within the device are known and have radiated energy that is far less in some angles than others. That is, the radiation patterns have nulls (also referred to as cold spots) in contrast to major lobs or points of maximum radiation (also referred to as hot spots). For example, the radiation pattern of one noise source is simulated and measured as a dipole antenna in which a first angle between the noise source and the antenna has a radio frequency interference (RFI) value that is less than a second angle between the noise source and the antenna. The first angle can be considered a null of the radiation pattern, whereas the second angle can be considered a lobe of the radiation pattern. The embodiments described herein, knowing the positions of the one or more motors and the radiation patterns of the noise sources when operating, can move the antenna, the noise source, or both to improve desense.

In one embodiment, a dynamic noise cancelation engine uses field distributions from a noise source on a PCB to identify where the radiated energy from the noise source can be far less at some angles. The pattern can be simulated or measured by near field scans and will be constant with the same PCB design. A processing device can determine that the noise source is operating and can use a dipole moment model, which represents the radiation pattern of the noise source, to determine an adjustment to a location and an orientation of the antenna and the noise source where the antenna receives less noise from the noise source. The orientation of the noise source, relative to the antenna, for example, can be expressed in terms of a direction or an angle of an angle from a frame of reference in three dimensional space. The orientation of the noise source relative to the antenna can be express in terms of orientation values, such as one or more azimuth angle, zenith angle, angle of incidence, tilt angle, or the like. For example, a device can be an autonomous mobile device that moves along a ground surface. The autonomous mobile device has a point of reference and the noise source is in a fixed position and orientation within the autonomous mobile device. The processing device thus knows the fixed position and orientation of the noise source as a result of knowing the current position and orientation of the autonomous mobile device. The antenna, however, can be disposed on a portion of the autonomous mobile device that is moveable relative to the noise source. The relative position and the relative orientation of the antenna and the noise source can be adjusted. The embodiments described herein can adjust the relative orientation (e.g., an angle) between the antenna and the noise source, the relative position (e.g., distance) between the antenna and the noise source, or both. The processing device (e.g., central processing unit CPU) can tell a microcontroller unit (MCU) that controls the motors of the robot to move the antenna, the noise source, or both to a location and an orientation where the antenna receives less noise radiated from the noise source.

Figure 1B:
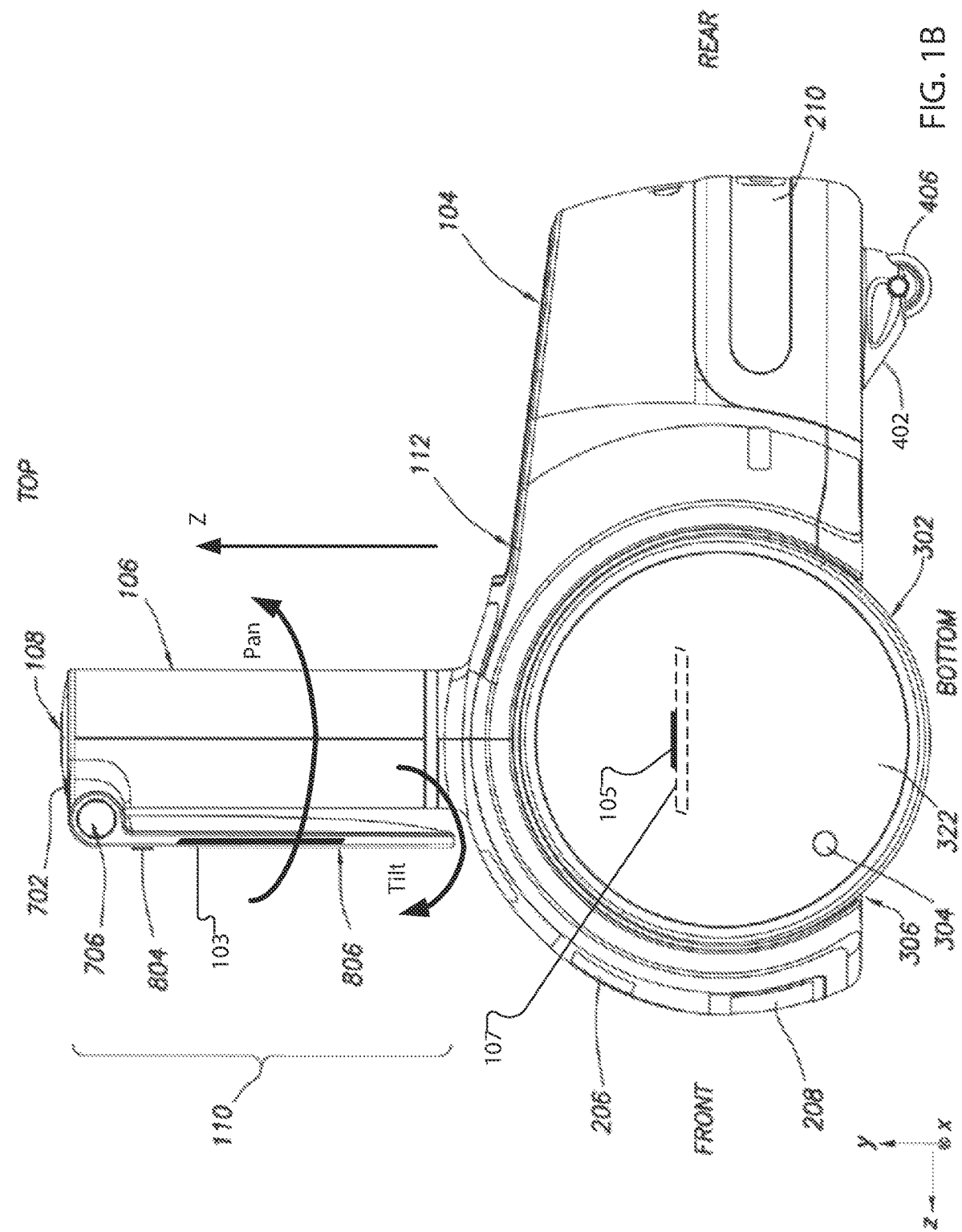
FIG. 1B illustrates a side view of the autonomous mobile device of FIG. 1A.

FIG. 1A illustrates a perspective view of an autonomous mobile device 100, such as a robot, which includes an antenna 103 disposed on a display assembly 110 and a component 105 disposed in the autonomous mobile device 100 that produces noise according to one embodiment. FIG. 1B illustrates a side view of the autonomous mobile device 100 of FIG. 1A. It should be noted that the component 105 is also referred to as a noise source or a noise component. Although the device 100 illustrates the one component 105, in other embodiments, the device 100 can include multiple noise components that can be accommodated using the techniques described herein.

The device 100 includes a main body 102 102. During operation, the device 100 may perform various functions such as moving about the environment, interacting with users, performing tasks, and so forth. The main body 102 102 may house various components such as batteries, processors, and so forth to support these functions. Some of these components are discussed in more detail below with regard to FIGS. 9 and 10.

The main body 102 102 may include various components. A front of the device 100 includes sensors windows 202, 204, 206, and 208 while a back of the device 100 may include a sensor window 210. These sensor windows 202-210 facilitate operation of various sensors. For example, if the sensor is a camera, the sensor window for that sensor is transparent to the wavelengths of light detected by the camera. In another example, if the sensor is an ultrasonic rangefinder, the sensor window may comprise a mesh that permits ultrasonic sound and corresponding echoes to pass through.

Mobility for the device 100 may be provided by one or more wheels. In the implementation shown, two main wheels 302 are depicted with a trailing caster assembly 402 having a caster wheel 406 as illustrated in FIG. 1B. The two main wheels 302 and the caster wheel 406 provide a tricycle or three-point support system. The main wheels 302 may be driven independently, allowing the device 100 to turn within a relatively small turn radius. Each of the main wheels 302 may have a wheel cover 322 that conceals a portion of the main wheel 302. In some implementations, the wheel cover 322 may include a release button 304. A user may press the release button 304 and separate the wheel cover 322 from the main wheel 302. This allows the wheel cover 322 to be removed for cleaning, replacement, and so forth. The wheel cover 322 may include a visual indicator, such as a printed pattern, feature, and so forth that provides a visual indicator as to when the main wheel 302 is rotating. In some implementations the release button 304 may also serve as a visual indicator.

The main wheel 302 may be sized to provide a relatively small gap 306 between an outer edge of a tire and a portion of the main body 102, as illustrated in FIG. 1B. For example, the gap 306 may be less than 3 millimeters (mm). By using a relatively small gap 306, fouling with foreign objects may be minimized.

Referring back to FIG. 1A, the main body 102 may include a modular payload bay 104. The modular payload bay 104 provides one or more of mechanical or electrical connectivity with the device 100. For example, modular payload bay 104 may include one or more engagement features such as slots, cams, ridges, magnets, bolts, and so forth that are used to mechanically secure an accessory within the modular payload bay 104. In one implementation, the modular payload bay 104 may comprise walls within which the accessory may sit. In another implementation, the modular payload bay 104 may include other mechanical engagement features such as slots into which the accessory may be slid and engage.

The modular payload bay 104 may include one or more electrical connections. For example, the electrical connections may comprise a universal serial bus (USB) connection that allows for the transfer of data, electrical power, and so forth between the device 100 and the accessory.

A tower 106 extends upwards from the main body 102. An extensible mast 108 (mast) that is able to extend upwards is stowed at least partially within the tower 106 and may extend into the main body 102. The mast 108 may be used to elevate a payload relative to the main body 102. The mast 108 is extensible and can be raised and lowered by operating a lift assembly. The mast 108 and the lift assembly may be able to rotate with respect to one another. For example, the mast 108 may pan or rotate relative to the lift assembly. The mast 108 can include multiple telescoping sections. An innermost section of the telescoping sections is attached to a payload via an upper mast interface. The payload may comprise sensors such as a camera, microphone, output devices such as a light, speaker, and so forth. In some implementations the payload may comprise connectors to allow for changing or adding other components. For example, the payload may include a physical engagement feature such as a shoe, cam, ridge, threaded bolt, and so forth. Continuing the example, the payload may include an electrical connector such as contacts, pogo pins, jumpers, and so forth. The electrical connector may be electrically connected to a conductor of a cable.

The tower 106 may pan left and right relative to the main body 102. In some implementations the mast 108 may pan in unison with the tower 106.

A top surface of the tower 106 may include one or more input devices, such as buttons 702. These buttons 702 may allow a user to perform functions such as turning the device 100 on or off, changing volume of sound produced by speakers on the device 100, and so forth.

A display assembly 110 is affixed to an upper portion of the tower 106. For example, an upper edge of the display assembly 110 is joined to the tower 106 by one or more hinges. The one or more hinges permit the display assembly 110 to tilt relative to the tower 106. For example, a right hinge 704 and a left hinge 706 are used to join the display assembly 110 to a shaft (not shown) that extends from the tower 106.

The display assembly 110 may include one or more components. For example, the display assembly 110 may include a frame that supports a first camera 802, a second camera 804, a display 806, and so forth. For example, the first camera 802 may comprise of a visible light camera while the second camera 804 comprises a depth camera. Continuing the example, the display 806 may comprise a touchscreen display that is able to present an image and accept input.

A pan and tilt assembly (not visible in FIG. 1A) is within the main body 102. The pan and tilt assembly comprises a first motor that rotates or pans the tower 106 and the mast 108. The pan and tilt assembly also includes a second motor that tilts the display assembly 110.

A carrying handle 112, as illustrated in FIG. 1B, may be provided that is proximate to a center of gravity of the device 100. For example, the carrying handle 112 may comprise a recess that has an opening with the modular payload bay 104 and extends into the main body 102. A user may use the carrying handle 112 to lift the device 100.

The autonomous mobile device 100 can include various components, such as one or more processors (e.g., a host processor or central processing unit (CPU), one or more graphic processors, input-output (I/O) devices, memory devices, storage devices, or the like.

The autonomous mobile device 100 includes a circuit board, such as a printed circuit board (PCB) 107 upon which one or more of the components described above are disposed. The components can be integrated into one or more integrated circuits. In some embodiments, the components can separate integrated circuits or chipsets. In other embodiments, the components can reside on a common carrier substrate die of an integrated circuit. For example, the autonomous mobile device 100 can include a processing element, one or more radios, including a baseband processor and RF front-end circuitry. The baseband processor is operable to generate RF signals to radiate electromagnetic energy via one or more antennas 103. In some cases, the baseband processor and other circuitry can be implemented in a RF module, such as a chipset implementing the Wi-Fi® technology. In addition to the baseband processor, the autonomous mobile device 100 can also include an application processor (AP) that implements other operations of the station client. In another embodiment, an application-specific integrated circuit (ASIC), a field-programmable gate array (FPGA), or other mixed-signal integrated circuits may be used to implement the operations described herein. In one embodiment, the baseband processor includes one or more transceivers that can operate at 2.45 GHz and 5 GHz. The baseband processor can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wirelessly using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

The device 100 can wirelessly communicate with a home wireless access point (WAP) device 111. The home WAP device 111 is connected to one or more devices over a network 113 (e.g., a local area network or the Internet). The network 113 can include one or more public or private networks, such as the Internet. The home WAP device 111 can be a standalone product or can be integrated into a modem, a router, a switch, a wireless network device, or any combination thereof, to provide access to a cloud computing system via a LAN or Internet access. For example, the home WAP device 111 can be hard wired or otherwise connected to a cable modem that provides the LAN and Internet access and the home WAP device 111 provide wireless access to the device 100 to the LAN and Internet access. The device 100 may connect to the network 113 to obtain content from a server computing system (e.g., an item providing system) or to perform other activities. The device 100 can connect to one or more different types of cellular networks, personal area networks (PANs) in addition to the WLAN (e.g., Wi-Fi® networks). In some embodiments, the home WAP device 111 provides access to the Internet, a private network, or other public networks.

The cloud computing system can include one or more cloud servers, one or more data storage device, as well as other resources. The cloud server provides one or more services or resources to the device 100. The WAP device 111 includes at least one WLAN radio (e.g., Wi-Fi® radio) that operates at 2.4 GHz, 5 GHz, or both. Alternatively, the provisioning system can be done with a remote server or other networking configurations.

As illustrated in FIG. 1A, the autonomous mobile device 100 includes the PCB 107 upon which at least the component 105 and a processing device 109 are disposed. The PCB 107 can also include a receiver 115 of a radio that is coupled to the antenna 103, and a memory device 117. The component 105 radiates electromagnetic energy in a radiation pattern as a noise source when operating. For example, the component 105 may operate at a lower frequency, but the harmonics cause high-frequency noise that is received at the antenna 103. The radiation pattern has at least one angle (or orientation) for which radio frequency interference (RFI) is less than other angles. That is, the radiation pattern can have at least one null. The memory device 117 stores noise profile data, such as a dipole moment model, that indicates a first orientation of the component 105 (noise source) with respect to the antenna 103 for which RFI is less than other orientations of the component 105 (noise source) with respect to the antenna 103. The memory device 117 can also store instructions of a dynamic noise cancelation engine that, when executed by the processing device 109, perform various operations, as described herein, to cause the autonomous mobile device 100 to move the antenna 103, the component 105 (via movement of the main body 102), or both to reduce interference between the antenna 103 and the component 105. Using the noise profile data to move the antenna 103 and the component 105 improves desense on the receiver 115 caused by the noise source (component 105).

In a further embodiment, the dipole moment model can also store additional indicators, such as quality levels. For example, the dipole moment model can store for each each whether it is a good angle, a medium angle, and a poor angle. These indicators can be used as part of the adjustment. For example, when a current angle is deemed to correspond to a poor angle or a range of poor angles, the processing device can adjust to an angle with a medium angle indicator or an angle with a good angle indicator. In some cases, the processing device can determine the next best available angle in the next level, such as an angle in the poor angle range can be adjusted to the closest angle with the medium angle indicator. Alternatively, other indicators and other metadata can be stored in connection with the different angles between the noise source and the antenna.

In the depicted embodiment, the display assembly 110 operates as a support member to the antenna 103 since the antenna 103 is disposed at an edge of the display assembly 110. In other embodiments, the antenna 103 can be disposed on other support members, including any exterior surface or interior surface of the device 100. Also, as illustrated in FIGS. 1A-1B, the tower 106 is a moveable assembly that permits the display assembly 110 to tilt and pan, as well as elevate. In other embodiments, the support member, upon which the antenna 103 is disposed, is coupled to a moveable assembly that is coupled to the main body 102. The moveable assembly includes a motor assembly (of multiple motors) that can rotate the support member about a first axis to tilt the support member in a first degree of freedom (DOF) and can rotate the support member about a second axis to pan the support member in a second DOF. In another embodiment, the motor assembly also can propel the autonomous mobile device 100 along a surface.

During operation, the dynamic noise cancelation engine can determine that the component 105 is operating, and thus, causing a radiation pattern that affects the antenna 103. The dynamic noise cancelation engine can determine a current orientation of the noise source relative to the antenna 103. The dynamic noise cancelation engine can determine an difference value to the current orientation to correspond to the first orientation stored in the noise profile data. The dynamic noise cancelation engine can cause the motor assembly to rotate the support member about the first axis to tilt the support member, rotate the support member about the second axis to pain the support member, or both, by the difference value.

In another embodiment, the dynamic noise cancelation engine can determine that the component 105 is operating, and thus, causing a radiation pattern that affects the antenna 103. The dynamic noise cancelation engine can determine a current angle between the noise source and the antenna. The noise dipole moment model can store a first angle between the noise source and the antenna and a corresponding first radio frequency interference (RFI) value indicating the noise at the antenna caused by the noise source when oriented at the first angle. The noise dipole moment model can also store a second RFI value indicating the noise at the antenna, caused by the noise source when oriented at the current angle, is higher than the first angle. The dynamic noise cancelation engine can determine an adjustment amount (e.g., difference value) that the noise source, the antenna, or both need to move to orient the noise source at the first angle. The dynamic noise cancelation engine can cause the motor assembly to rotate the support member about the first axis to tilt the support member, rotate the support member about the second axis to pain the support member, or both, by the adjustment amount. In some cases, the adjustment amount can be merely a difference in angle in one or both degrees of freedom. In some cases, the output to the MCU can indicate specific movements to achieve the desired angle. In other cases, the output can simply specify the relative angle or the desired angle and the MCU can determine the number of rotations by the specific motors to achieve the desired angle. In some cases, the output to the MCU can specify yaw, pitch, and/or roll values for the motors. In other cases, the adjustment amount can be specified as the absolute angle.

As described above, the tower 106 can include an extensible mast. The extensible mast can be coupled between the support member and the main body 102. The motor assembly can translate the support member relative to the main body 102. The noise profile data stored in the memory device 117 can include a dipole moment model that indicates a first height of the antenna 103 relative to the component 105 (noise source) and the first angle between the component 105 (noise source) and the antenna 103 for which the RFI is less than other heights and angles between the component 105 (noise source) and the antenna 103. During operation, the dynamic noise cancelation engine can determine a current height of the antenna 103 relative to the component 105 (noise source) and can determine a second adjustment amount to the current height to move the antenna to the first height. The dynamic noise cancelation engine can cause the motor assembly to translate the extensible mast by the second adjustment amount to the first height.

In another embodiment, the dipole moment model can indicate a first location and a first orientation of the component 105 (noise source) with respect to the antenna 103 for which the RFI is less than other locations and orientations of the component 105 (noise source) with respect to the antenna 103. During operation, the dynamic noise cancelation engine can determine a current location of the component 105 (noise source) and a second adjustment amount to the current location to move the antenna to the first location. The dynamic noise cancelation engine can cause the motor assembly to at least one of rotate the support member about the first axis to tilt the support member, rotate the support member about the second axis to pan the support member, or translate the extensible mast by the adjustment amount to the first location.

Although the device 100 is an autonomous mobile device 100, in other embodiments, the device 100 can be other types of devices, including a device in which the antenna 103 and a noise source can be moved relative to one another.

For example, in another embodiment, an electronic device includes a support member, a base assembly, and a moveable assembly coupled to the base assembly and the support member. The moveable assembly includes a first motor to move the moveable assembly about a first DOF and a second motor to move the moveable assembly about a second DOF. The electronic device also includes a circuit board disposed within the base assembly and includes at least a receiver, a processing device, a memory device, and a component 105 that radiates electromagnetic energy in a radiation pattern as a noise source when operating. The memory device stores noise profile data of the component 105 and the noise profile data indicates that radiated energy received at the antenna from the noise source being at a first angle is less than radiated energy received at the antenna from the noise source being at a second angle. An antenna 103 is coupled to the receiver and disposed on the support member. The processing device can determine that the component 105 is operating, and thus, radiating electromagnetic energy in the radiation pattern. The processing device determines determine a current position of the antenna relative to the component and determines a current angle between the component 105 and the antenna 103. The processing device can determine using the position of the motors to determine the current location of the antenna. The processing device already knows the position of the component. Using the position of the component and the current position of the antenna, the processing device can determine the current angle between the component and the antenna. The processing device determines an adjustment amount to the current angle to correspond to the first angle in the first radiation where the radiated energy is less than at the second angle in the radiation pattern. The processing device causes the moveable assembly to move at least one of the antenna 103 or the base assembly according to the adjustment amount.

In a further embodiment, the support member, the base assembly, and the moveable assembly are parts of a robot or a robotic assembly. The robot can include at least the first DOF and the second DOF, but may include additional components to implement additional degrees of freedom (DOFs), such as one or more wheels, robotic arms, tracks, or the like. The DOFs can be rotational or translational DOFs.

In some embodiments, the motor assembly is controlled by a microcontroller or a microcontroller unit (MCU). The processing device is coupled to the MCU and the processing device outputs the adjustment amount (e.g., a difference value) to the microcontroller. The MCU microcontroller moves at least one of the antenna 103 and the base assembly by to the adjustment value.

In one embodiment, the noise profile data of the component 105 includes a dipole moment model. The dipole moment model can indicate a first dipole moment magnitude value corresponding to the first angle between the component 105 and the antenna 103. The first dipole moment magnitude value can represent radiated energy received at the antenna from the noise source being at the first angle between the antenna and the noise source. The first dipole moment magnitude value can be less than a second dipole moment magnitude value corresponding to the current angle.

In another embodiment, the noise profile data of the component 105 indicates that the first angle has a RFI value that is less than RFI values for other angles of the component 105 (noise source) with respect to the antenna 103. The noise profile data can be derived from near field scans of the component 105, as described in more detail below.

In another embodiment, a robotic device includes a robot with a support member, a moveable assembly having a first rotational DOF, a second rotational DOF, and a translational DOF. The robotic device includes a noise component (e.g., 105), as described herein, and an antenna 103 disposed on the support member. The relative location and orientation of the noise component and the antenna 103 can be moved via the moveable assembly. The robotic device also includes a receiver and a processing device and the processing device is to perform the following: determine that the noise component is radiating electromagnetic energy in a radiation pattern known to the processing device. The processing device determines, from the known radiation pattern, a first location and a first orientation between the noise component and the antenna 103 for which RFI at the receiver is less than other locations and orientations between the noise component and the antenna 103; determine a current location and a current orientation of the noise component relative to the antenna 103; determine a difference value to the current location, the current orientation, or both to correspond to the first location and first orientation; and cause the moveable assembly to move at least one of the antenna 103 or the noise component according to the difference value.

In a further embodiment, the robot further includes a base assembly with multiple motorized wheels, a first motor to rotate the support member about the first rotational DOF, a second motor to rotate the support member about the second rotational DOF, and a third motor to translate the support member about the third translational DOF. In a further embodiment, the moveable assembly includes a tower with an extensible mast configurable to translate the support member in the third translational DOF. In one embodiment, the processing device can cause the moveable assembly to move only the noise component according to the difference value while maintaining at least the orientation of the display. In another embodiment, the processing device can cause the moveable assembly to move only the antenna 103 according to the difference value while maintaining at least the current location of the noise component noise component.

In another embodiment, the moveable assembly includes a robotic arm having at least the first rotational degree of freedom and the second rotational degree of freedom. In another embodiment, a display is disposed on the support member and the processing device can cause the robotic arm to maintain a current location and a current orientation of the display while moving only the noise component by the difference value. Alternatively, the processing device can cause the robotic arm to maintain the current location and current orientation of the noise component, while moving only the antenna by the difference value.

Figure 2A:
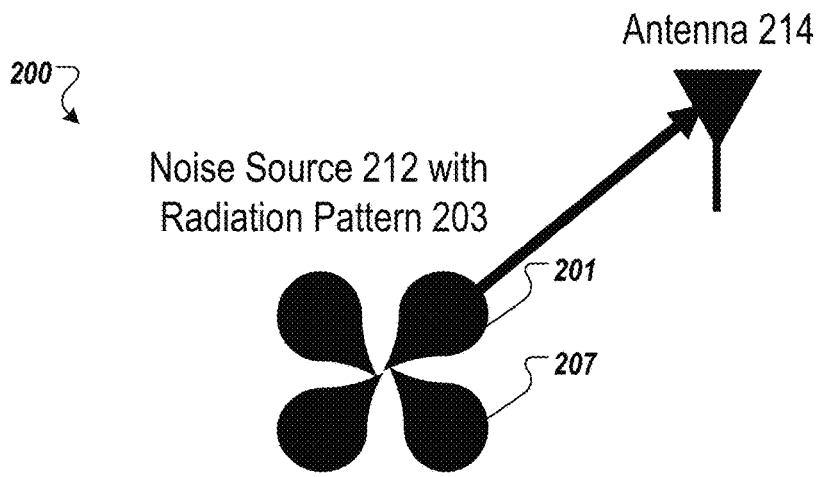
FIGS. 2A-2C illustrate various orientations of a noise source and an antenna of an electronic device according to various embodiments.
Figure 2B:
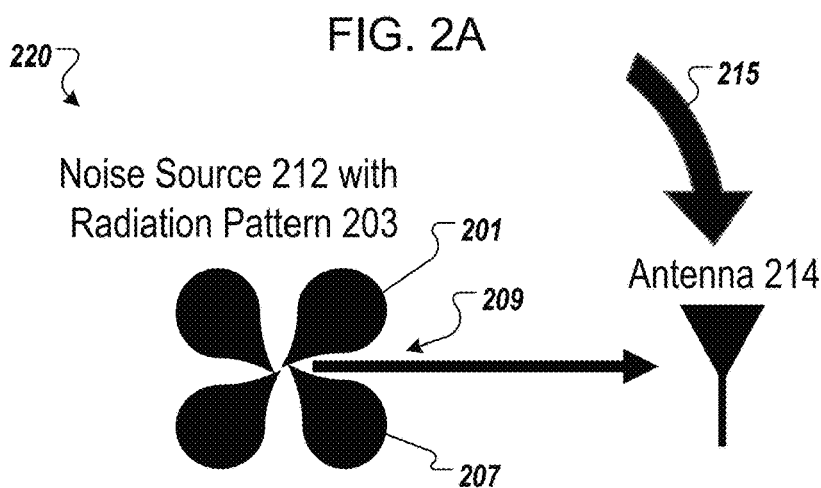
Figure 2C:
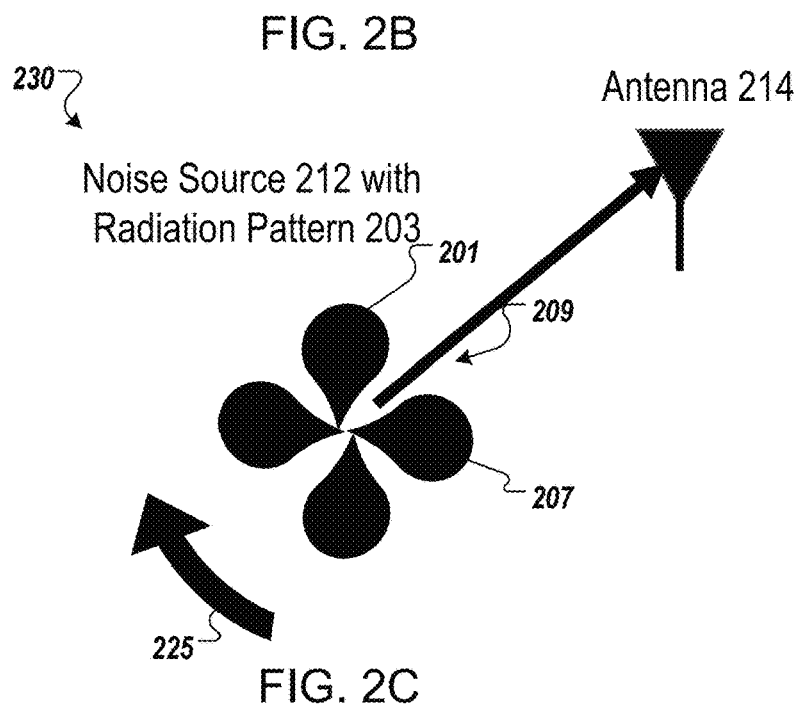

FIGS. 2A-2C illustrate various orientations of a noise source and an antenna of an electronic device according to various embodiments. FIG. 2A illustrates a scenario 200 where a lobe 201 of a radiation pattern 203 of a noise source 212 is oriented at a specified angle relative to an antenna 214. This may represent a worst-case scenario when one of the lobes of the noise source 212 is aligned in a direction towards the antenna 214. Using the known radiation pattern and the positions and orientations of the noise source 212 and the antenna 214, the processing device can move the noise source 212, the antenna 214, or both as described herein and as illustrated individually with respect to FIGS. 2B-2C.

FIG. 2B illustrates a scenario 220 where the antenna 214 is moved by an adjustment amount 215 such that a null 209 between the lobe 201 and a lobe 207 of the radiation pattern 203 is oriented at a specified angle relative to an antenna 214. That is, the antenna 214 is moved to a position/orientation with less noise radiation. The antenna 214 can be moved by an electronic device, having a System on Chip (SoC), a microcontroller unit (MCU), and motors, as illustrated in FIG. 3, to a position where the antenna 214 receives less noise radiated from the noise source 212.

FIG. 2C illustrates a scenario 230 where the noise source 212 is moved by an adjustment amount 225 such that the null 209 between the lobe 201 and the lobe 207 is oriented at a specified angle relative to an antenna 214. That is, the noise source 212 is moved to a position/orientation so that a null of the radiation pattern 203 is pointing to the antenna 214. The noise source 212 can be moved by an electronic device, having a SoC, a MCU, and motors, as illustrated in FIG. 4, to a position where the noise source 212 radiates less noise energy to the antenna 214.

In some cases, the SoC can already track the amount of noise from a WLAN radio. This data can be used as actual feedback to adjustments being made. That is, the actual feedback from the WLAN radio tracking the amount of noise can be used to determine whether the adjustments to the location and angles of the noise source and the antenna achieve a desired mitigation in RFI.

Figure 3:
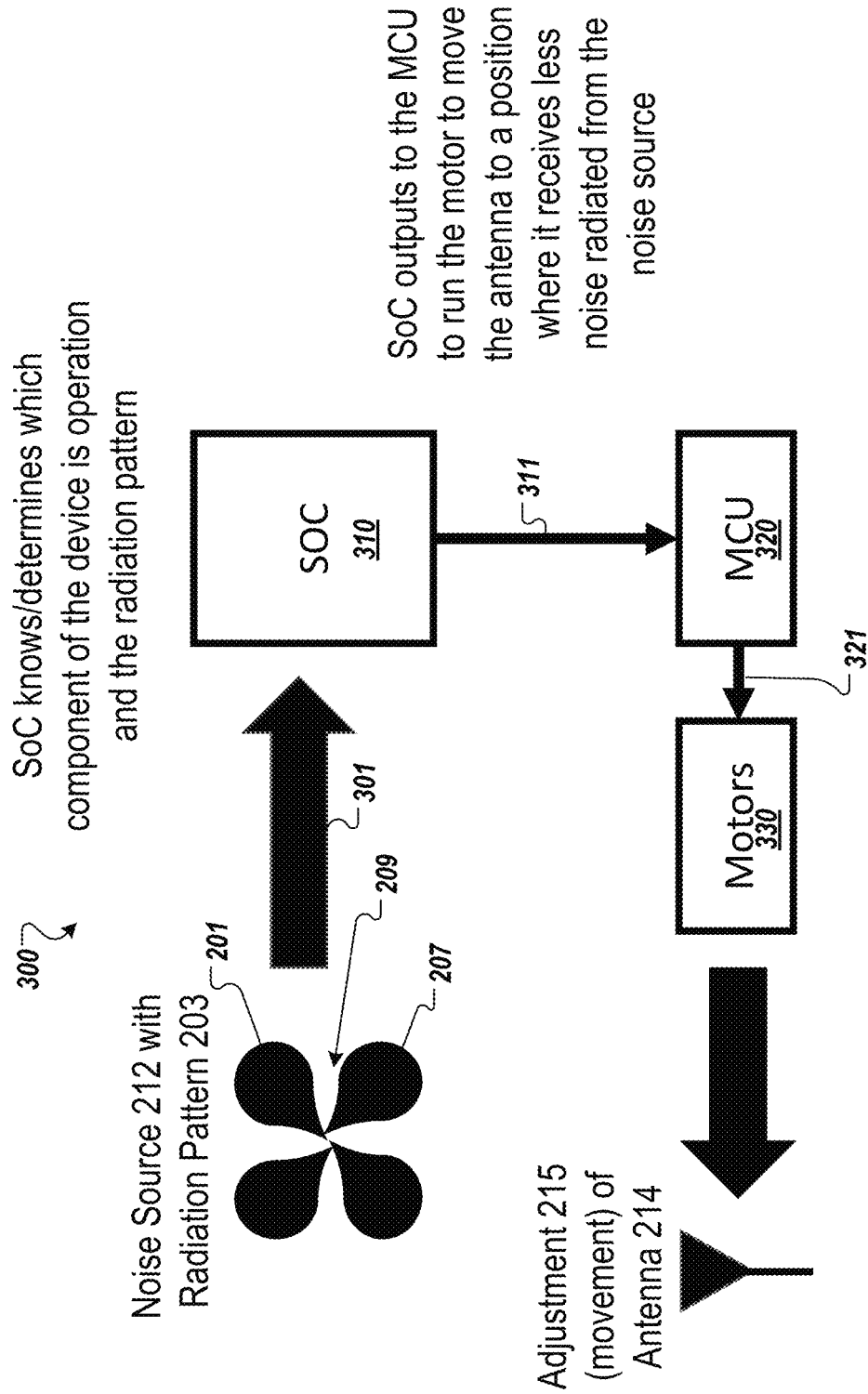
FIG. 3 illustrates an electronic device with a System on Chip (SoC), a microcontroller unit (MCU), and motors to move an antenna to a position where the antenna receives less noise radiated from a noise source according to one embodiment.

FIG. 3 illustrates an electronic device 300 with a SoC 310, a MCU 320, and motors 330 to move an antenna 214 to a position where the antenna 214 receives less noise radiated from a noise source 212 according to one embodiment. As described above with respect to the scenario 220 of FIG. 2B, the electronic device 300 can determine an adjustment amount 215 to move the antenna 214 to a position where the antenna 214 receives less noise radiated from a noise source 212. In particular, the SoC 310 can receive noise profile data 301 that represents the radiation pattern 203. In one embodiment, the noise profile data 301 includes a dipole moment model as described herein. The noise profile data 301 indicates at least one angle where the radiated energy is significantly lower than another angle, such as the angle of the null 209 as compared to the angle of the lobe 201, as illustrated in FIG. 3. The noise profile data 401 can indicate an angle for each of the nulls, an angle for each of the lobes, or any combination thereof. The SoC 310 already knows or can determine which components are operating, as well as the corresponding radiation patterns of the components when operating. The SoC 310 can determine the adjustment amount 215 to move the antenna 214 to a position where the antenna 214 receives less noise radiated from the noise source 212. The SoC 310 outputs data 311 to the MCU 320 to tell the MCU 320 to run the motors 330 and move the antenna 214 to the specified position (or to move the adjustment amount 215). The MCU 320 outputs data 321 to the motors 330 to cause the movement of the antenna 214 by the adjustment amount 215.

Figure 4:
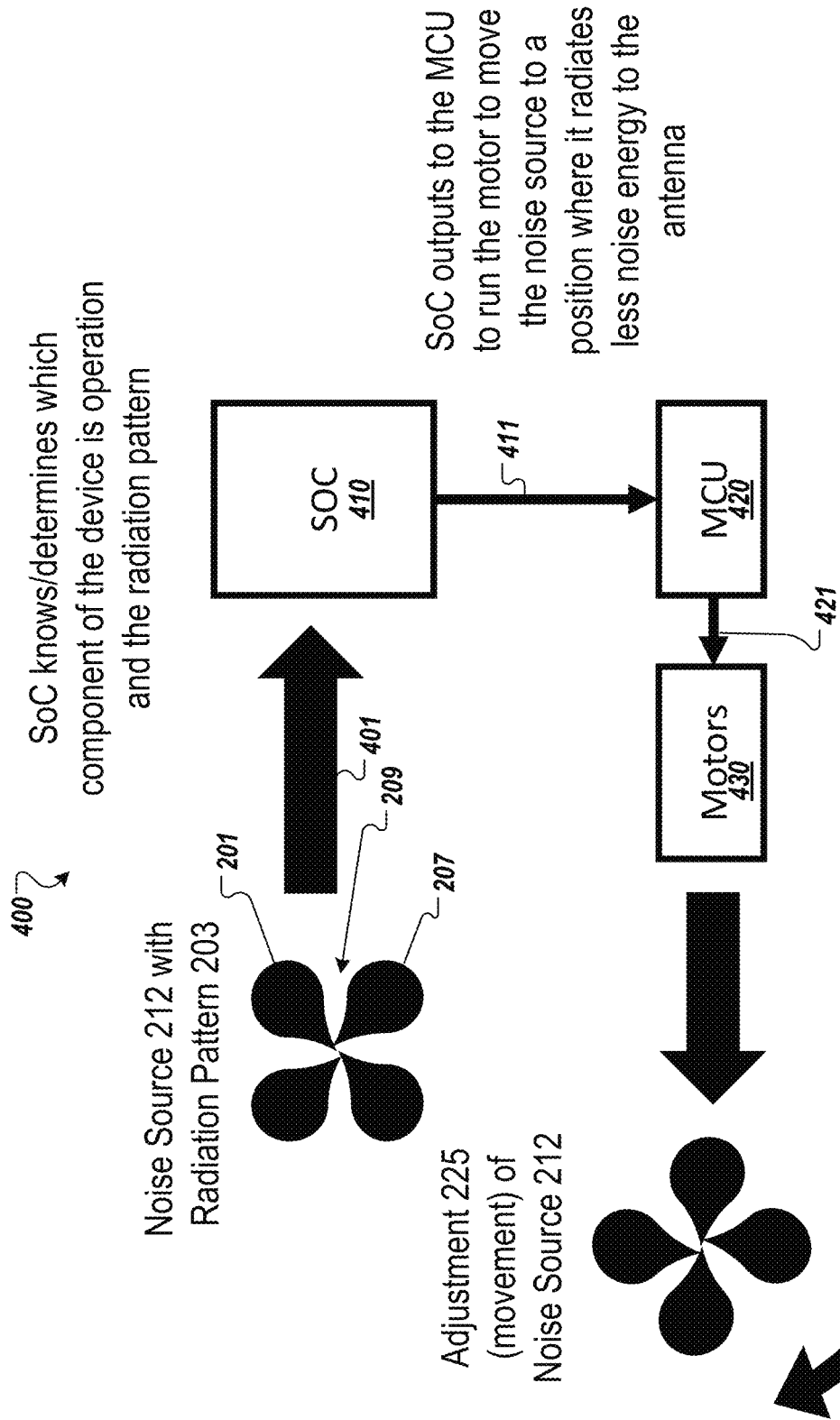
FIG. 4 illustrates an electronic device with a SoC, a MCU, and motors to move a noise source to a position where the noise source radiates less noise energy to the antenna according to one embodiment.

FIG. 4 illustrates an electronic device 400 with a SoC 410, a MCU 420, and motors 430 to move a noise source to a position where the noise source radiates less noise energy to the antenna according to one embodiment. As described above with respect to the scenario 230 of FIG. 2C, the electronic device 400 can determine an adjustment amount 225 to move the noise source 212 to a position where the noise source 212 radiates less noise energy to the antenna 214. In particular, the SoC 410 can receive noise profile data 401 that represents the radiation pattern 203. In one embodiment, the noise profile data 401 includes a dipole moment model as described herein. The noise profile data 401 indicates at least one angle where the radiated energy is significantly lower than another angle, such as the angle of the null 209 as compared to the angle of the lobe 201, as illustrated in FIG. 4. The noise profile data 401 can indicate an angle for each of the nulls, an angle for each of the lobes, or any combination thereof. The SoC 410 already knows or can determine which components are operating, as well as the corresponding radiation patterns of the components when operating. The SoC 410 can determine the adjustment amount 225 to move the noise source 212 to a position where the noise source 212 radiates less noise energy to the antenna 214. The SoC 410 outputs data 411 to the MCU 420 to tell the MCU 420 to run the motors 430 and move the noise source 212 to the specified position (or to move the adjustment amount 225). The MCU 420 outputs data 421 to the motors 430 to cause the movement of the noise source 212 by the adjustment amount 225.

Figure 5:
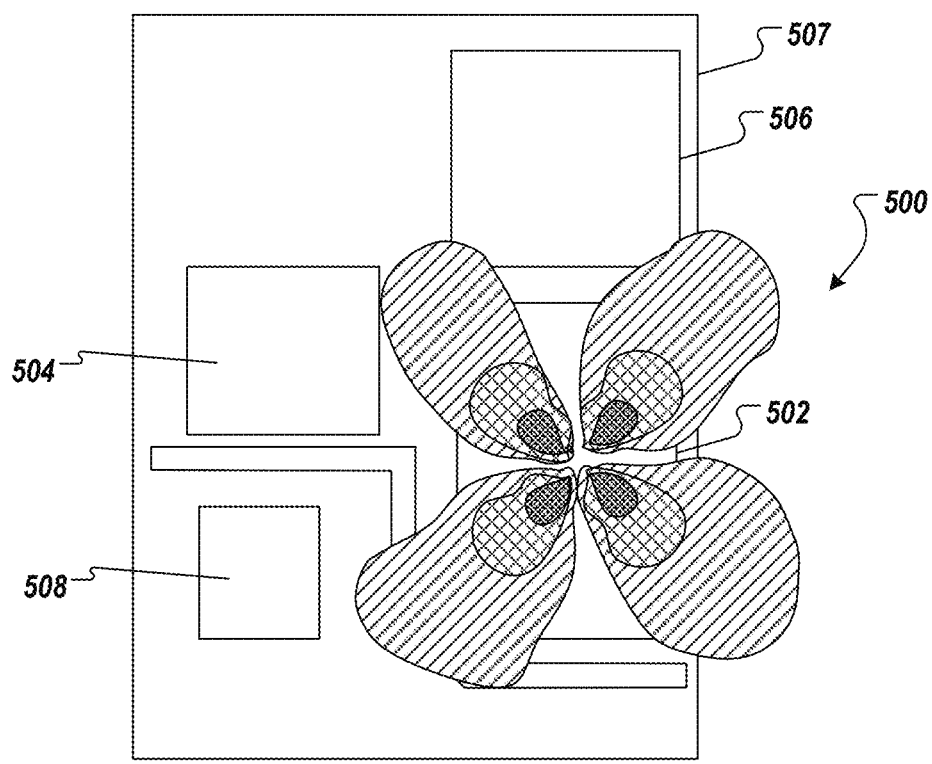
FIG. 5 illustrates a noise source radiation pattern from a noise component on a PCB according to one embodiment.

FIG. 5 illustrates a noise source radiation pattern 500 from a noise component 502 on a PCB 507 according to one embodiment. The PCB 507 includes multiple components 502, 504, 506, and 508. The noise component 502 can be an integrated circuit disposed on the PCB 507, as illustrated in FIG. 5. When operating, the noise component 502 radiates electromagnetic energy to form the noise source radiation pattern 500. The noise source radiation pattern 500 can be the harmonics of the operating frequency of the integrated circuit, for example. The radiation pattern 500 includes four main lobes extending out in four directions at four specific angles. The radiation pattern 500 also includes four nulls at four specified angles. This shows that the radiated energy of the noise source radiation pattern 500 is far less in some angles. Since the PCB 507 and the corresponding components are not likely to change after deployment, the noise source radiation pattern 500 can be simulated, measured, and modeled. In one embodiment, the noise source radiation pattern 500 is simulated and measured by near field scans and modeled as dipole moments as described in more detail with respect to FIGS. 6-7. For example, a technique to measure and reconstruct noise sources in the near field domain can be done to represent them using a dipole movement model. A dipole moment model can be used to estimate RFI (desense). The noise source radiation pattern 500 can be constant with the same PCB design.

FIG. 6 is a flow diagram of a method 600 for generating a dipole moment model of the noise source radiation pattern of FIG. 5 according to one embodiment. The method 600 may be implemented using processing logic comprising hardware, software, firmware, or any combination thereof. In some embodiments, the method 600 is performed in a modeling software tool executing by a computer system that is separate from the electronic devices described herein. That is, a separate computer can be used to generate the dipole moment model for a particular PCB design and the dipole movement model can be stored in a memory device of the PCB before deployment.

Referring to FIG. 6, the processing logic begins by defining a near field scanning plane (see 701 of FIG. 7) of a noise source (block 602). The processing logic defines dipole locations and dipole types of the noise source (block 604). The processing logic calculates coordinates for the noise source(s) (block 606). The processing logic calculates the transfer functions that relate each noise source to each scanning point in the near field scanning plane (block 608). The processing logic estimates the dipole magnitudes, such as by using the least square method (block 610). Based on the estimates, the processing logic generates the dipole moment model (block 612) with the corresponding adjustment values that are used to move the antenna, the noise source, or both to a position, an orientation, or both to reduce RFI as described herein; and the method 600 ends.

FIG. 7 illustrates a near field scanning plane 701 and corresponding dipole moments 703 for modeling the noise source radiation pattern 500 of FIG. 5 according to one embodiment.

In another embodiment, the following set of operations cover a technique to measure and reconstruct noise sources in the near field domain to represent them using a dipole moment model to estimate RF interference (Desense). For this set of operations, a Forward problem (Aggressor) is used for understanding the nature of the electromagnetic (EM) fields from the noise source's perspective. The magnetic and electric fields (H/E fields) are collected but can be represented by dominant M or P dipole moment. A Reverse problem (Victim) is used for understanding the nature of the EM parameters at the noise source location as seen by an antenna. The EM parameters here can be represented by H or E fields. The Total Forward voltage, which is coupled on to the antenna port due to the noise source, can be expressed as follows:

$$U_{fwd} = 25 |Mdipole||Hreverse|$$

It should be noted that, when a current loop faces in a particular axis, the dipole can be denoted with a diploe axis respectively.

In one embodiment, the following workflow can be done to measure and reconstruct the noise source in the near field domain to represent the noise source using a dipole moment model to estimate RF interference (desense):

1. Near field EM Scanner: Using a near field EM scanner, the noise source is scanned and the forward fields are obtained. The forward fields must be collected in all axes of interest (e.g., measured Hx Mag [dBA/m] and measured Hy Mag [dBA/m]). Field Acquisition: The scanner can be connected to a spectrum analyzer and can be configured with amplitude detector and trace settings to enable accurate representation of the field. Correct settings can be achieved through experimentation. DUT Settings: The noise source can be configured to a specified state (e.g., a stress mode, a transmit mode) for the scanner to collect and reduce errors in the process. For example, a 1 mm Magnetic loop probe for X-Y EMI probes: An appropriate probe with the correct sensitivity and selectivity must be selected for field acquisition. Probe factor and other losses/gains can be calibrated in later steps. Scan Area: Near field data must be picked up from a suitable height and spatial resolution to observe a correct pattern.

2. Reconstruction and Processing: Raw-field processing: The Raw field-E/H output can be manipulated for probe factor and gains, source area can be confined and data can be formatted to be reconstructed. (Convert_scanner.m). The processed field is input into a computing program (e.g., a computing problem solver), such as Matlab, and the computing program outputs the dipole moment magnitude. Dipole Moment Generation: Dipole identify can be established based on known patterns. An ideal pattern can be generated from measured-scanned plane based on the type of dipole selected. The least square method can be used to estimate dipole magnitude (moment_generation.m).

3. RFI Estimation: Simulation method: Given the dipole is placed in an EM simulator, such as CST, with current port excitation at the measured dipole center. A simulation can be run to obtain voltage at antenna port from the dipole. Normalizing derived voltage vs CST excitation can be used to estimate RFI. (CST_coupled_voltage.m). Measurement method: At the measured dipole center, the Reverse field can be obtained using the Scanner. Using the $U_{fwd}$ equation, RFI can be calculated. (Measured_RFI_Calc.m). RFI can be calculated using the computing program (a computing problem solver), such as Matlab.

4. RFI Mitigation: Reverse Problem Manipulation: The reverse fields of the antenna can be studied to mitigate RFI. Understanding the source dipole identity and dominant field can allow a "cold spot" to be located. This can be a location and an orientation of the noise source with respect to the antenna. Varying the location and structure of the antenna can lead to a larger solution space for the same. Reverse fields can be obtained through simulation/measurement methods. (optim_RFI.m).

It should be noted that this technique can estimate and reconstruct sources that can be represented by a single dipole. However, not all sources can exhibit dipole patterns. The technique, however, can be extended to various types of noise components, including connectors, integrated circuits, high-speed interfaces, or the like. Also, the application and principles of this technique can be extended to characterize EMI, shielding effectiveness and RSE with relative comparison.

Figure 8:
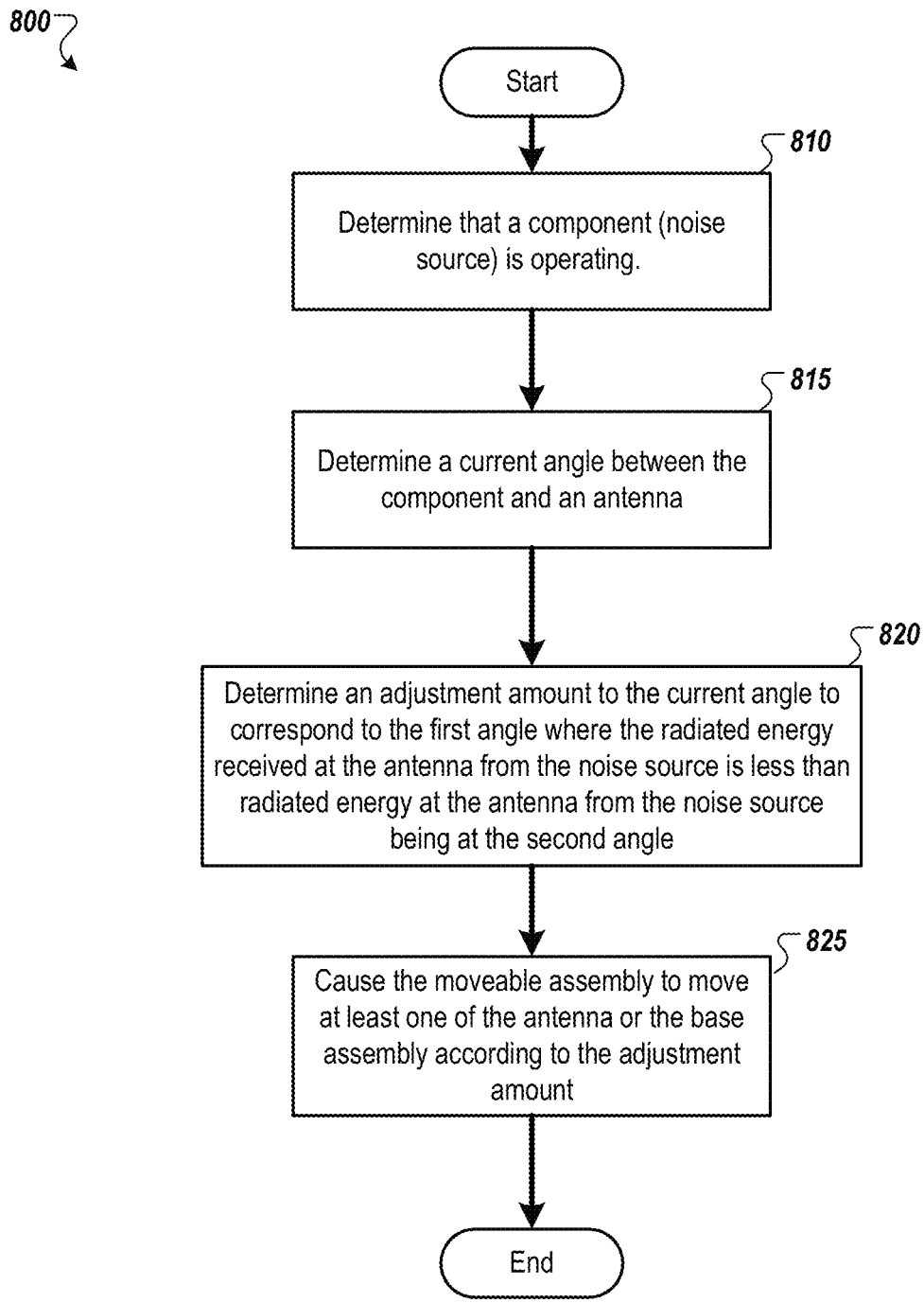
FIG. 8 is a flow diagram of a method of operating an electronic device with a moveable assembly to move an antenna, a noise source, or both according to one embodiment.

FIG. 8 is a flow diagram of a method 800 of operating an electronic device with a moveable assembly to move an antenna, a noise source, or both according to one embodiment. The method 800 may be implemented using processing logic comprising hardware, software, firmware, or any combination thereof. In some embodiments, the method 800 is performed by any one of the electronic devices described above with respect to FIGS. 1-4.

Referring to FIG. 8, the processing logic begins by determining that a component (noise source) is operating (block 810). The processing logic determines a current angle between the component and an antenna (block 815). The processing logic determines an adjustment amount to the current angle to correspond to the first angle where the radiated energy received at the antenna from the noise source is less than the radiated energy received at the antenna from the noise source at the second angle in the radiation pattern (block 820). At block 825, the processing logic causes the moveable assembly to move at least one of the antenna or the base assembly according to the adjustment amount; and the method 800 ends.

In one embodiment, the processing logic can determine which noise source of multiple noise sources is the largest contributor of noise at the antenna 103. Using the radiation pattern from this particular noise source, the processing logic can determine the adjustment amount. In another embodiment, the processing logic can determine the adjustment considering multiple radiation patterns from multiple noise sources. It should be noted that the adjustments can be made incrementally as an iterative process. Alternatively, the adjustment can be made in a single iteration.

Figure 9:
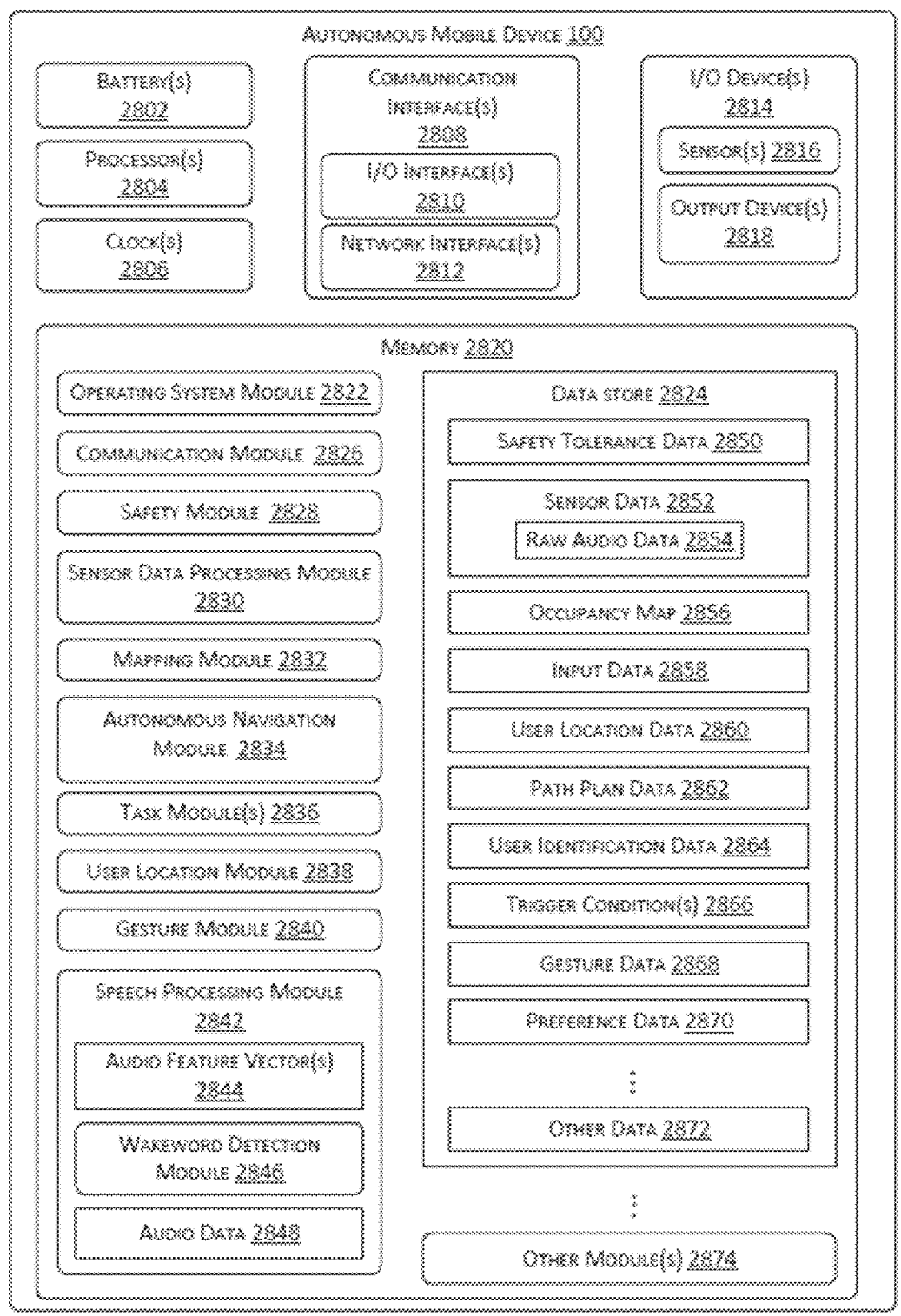
FIG. 9 is a block diagram of the components of the autonomous mobile device of FIG. 1A according to some implementations.

FIG. 9 is a block diagram 2800 of the components of the autonomous mobile device 100 of FIG. 1A according to some implementations. The device 100 may include one or more batteries 2802 to provide electrical power suitable for operating the components in the device 100. In some implementations other devices may be used to provide electrical power to the device 100. For example, power may be provided by wireless power transfer, capacitors, fuel cells, storage flywheels, and so forth.

The device 100 may include one or more hardware processors 2804 (processors) configured to execute one or more stored instructions. The processors 2804 may comprise one or more cores. The processors 2804 may include microcontrollers, systems on a chip, field programmable gate arrays, digital signal processors, graphic processing units, general processing units, and so forth. One or more clocks 2806 may provide information indicative of date, time, ticks, and so forth. For example, the processor 2804 may use data from the clock 2806 to associate a particular interaction with a particular point in time.

The device 100 may include one or more communication interfaces 2808 such as input/output (I/O) interfaces 2810, network interfaces 2812, and so forth. The communication interfaces 2808 enable the device 100, or components thereof, to communicate with other devices or components. The communication interfaces 2808 may include one or more I/O interfaces 2810. The I/O interfaces 2810 may comprise Inter-Integrated Circuit (I2C), Serial Peripheral Interface (SPI), Universal Serial Bus (USB) as promulgated by the USB Implementers Forum, RS-232, and so forth.

The I/O interface(s) 2810 may couple to one or more I/O devices 2814. The I/O devices 2814 may include input devices such as one or more of a sensor 2816, keyboard, mouse, scanner, and so forth. The I/O devices 2814 may also include output devices 2818 such as one or more of a motor, light, speaker, display, projector, printer, and so forth. In some embodiments, the I/O devices 2814 may be physically incorporated with the device 100 or may be externally placed.

The network interfaces 2812 may be configured to provide communications between the device 100 and other devices such as other devices 100, a docking station, routers, access points, and so forth. The network interfaces 2812 may include devices configured to couple to personal area networks (PANs), local area networks (LANs), wireless local area networks (WLANS), wide area networks (WANs), and so forth. For example, the network interfaces 2812 may include devices compatible with Ethernet, Wi-Fi, Bluetooth, Bluetooth Low Energy, ZigBee, and so forth.

The device 100 may use the network interfaces 2812 to connect to a network. For example, the network may comprise a wireless local area network that in turn is connected to a wide area network such as the Internet.

The device 100 may also include one or more busses or other internal communications hardware or software that allow for the transfer of data between the various modules and components of the device 100. As shown in FIG. 9, the device 100 includes one or more memories 2820. The memory 2820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 2820 provides storage of computer-readable instructions, data structures, program modules, and other data for the operation of the device 100. A few example functional modules are shown stored in the memory 2820, although the same functionality may alternatively be implemented in hardware, firmware, or as a system on a chip (SoC).

The memory 2820 may include at least one operating system (OS) module 2822. The OS module 2822 is configured to manage hardware resource devices such as the I/O interfaces 2810, the I/O devices 2814, the communication interfaces 2808, and provide various services to applications or modules executing on the processors 2804. The OS module 2822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 2820 may be a data store 2824 and one or more of the following modules. These modules may be executed as foreground applications, background tasks, daemons, and so forth. The data store 2824 may use a flat file, database, linked list, tree, executable code, script, or other data structure to store information. In some implementations, the data store 2824 or a portion of the data store 2824 may be distributed across one or more other devices including other devices 100, servers, network attached storage devices, and so forth.

A communication module 2826 may be configured to establish communication with other devices 100, an external server, a docking station, and so forth. The communications may be authenticated, encrypted, and so forth.

Other modules within the memory 2820 may include a safety module 2828, a sensor data processing module 2830, a mapping module 2832, an autonomous navigation module 2834, a path planning module, the one or more task modules 2836, the user location module 2838, a gesture module 2840, a speech processing module 2842, or other modules 2874. The modules may access data stored within the data store 2824, such as safety tolerance data 2850, sensor data 2852, or other data 2872.

The safety module 2828 may access safety tolerance data 2850 to determine within what tolerances the device 100 may operate safely within the physical environment. For example, the safety module 2828 may be configured to stop the device 100 from moving when the extensible mast 108 is extended. In another example, the safety tolerance data 2850 may specify a minimum sound threshold which, when exceeded, stops all movement of the device 100. Continuing this example, detection of sound such as a human yell would stop the device 100. In another example, the safety module 2828 may access safety tolerance data 2850 that specifies a minimum distance from an object that the device 100 may maintain. Continuing this example, when a sensor 2816 detects an object has approached to less than the minimum distance, all movement of the device 100 may be stopped. Movement of the device 100 may be stopped by one or more of inhibiting operations of one or more of the motors, issuing a command to stop motor operation, disconnecting power from one or more of the motors, and so forth. The safety module 2828 may be implemented as hardware, software, or a combination thereof.

The safety module 2828 may control other factors, such as a maximum speed of the device 100 based on information obtained by the sensors 2816, precision and accuracy of the sensor data 2852, and so forth. For example, detection of an object by an optical sensor may include some error, such as when the distance to an object comprises a weighted average between an object and a background. As a result, the maximum speed permitted by the safety module 2828 may be based on one or more factors such as the weight of the device 100, nature of the floor, distance to object, and so forth. In the event that the maximum permissible speed differs from the maximum speed permitted by the safety module 2828, the lesser speed may be utilized.

The sensor data processing module 2830 may access sensor data 2852 that is acquired from one or more the sensors 2816. The sensor data processing module 2830 may provide various processing functions such as de-noising, filtering, change detection, and so forth. Processing of sensor data 2852, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 2852. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 2852 or other data 2872. For example, the ANN may be a trained using a supervised learning algorithm such that object identifiers are associated with images of particular objects within training images provided to the ANN. Once trained, the ANN may be provided with the sensor data 2852 and produce output indicative of the object identifier.

The autonomous navigation module 2834 provides the device 100 with the ability to navigate within the physical environment without real-time human interaction. The autonomous navigation module 2834 may implement, or operate in conjunction with, the mapping module 2832 to determine the occupancy map 2856 or other representation of the physical environment. In one implementation, the mapping module 2832 may use one or more simultaneous localization and mapping ("SLAM") techniques. The SLAM algorithms may utilize one or more of maps, algorithms, beacons, or other techniques to provide navigational data. The navigational data may then be used to determine the path plan data 2862 which is then subsequently used to determine a set of commands that drive the motors connected to the wheels 302. For example, the autonomous navigation module 2834 may determine a location with the environment, estimate a path to a destination, and so forth.

A path planning module may be part of, or operate in conjunction with, the autonomous navigation module 2834. During operation, the autonomous navigation module 2834 may use the occupancy map 2856, the user location data 2860, the gesture data 2868, preference data 2870, and so forth to determine path plan data 2862. For example, the autonomous navigation module 2834 may determine a current location of the device 100 and determine an overall course that the device 100 is to follow to perform a task, while the path planning module handles a portion of that course that is proximate to the device 100. Continuing the example, the path planning module may be used to determine a course from the device's 100 current location to a first waypoint elsewhere in the room that was determined by the autonomous navigation module 2834.

The path planning module may determine path plan data 2862 at specified intervals, upon receipt of data indicative of a change, and so forth. For example, the path planning module may determine path plan data 2862 at a specified interval, such as every 200 ms, or every meter. Appearance of an obstacle may result in determination of path plan data 2862 outside of the specified interval. The user trajectory module may also determine predicted trajectory data at specified intervals, upon a change in location of the user, and so forth.

In some implementations the path planning module may generate a plurality of possible paths to a waypoint, and then score or rank those paths. A highest scoring path, deemed to be most suitable, may then be selected and used as the path plan data 2862. For example, the ranking may be based on the sum of the combined values of the obstacle cost values, and so forth for the areas or cells that are traversed by the possible path. In other implementations the ranking may be based on time to arrive.

The path plan data 2862 may be subsequently used to direct the movement of the device 100. For example, the path plan data 2862 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the device 100 at a rate of 10.0 radians per second (rad/s) for 5 seconds and a second motor on a right side of the device 100 at a rate of 9.7 rad/s for 5 seconds.

The autonomous navigation module 2834 may include an obstacle avoidance module. For example, if an obstacle is detected along a planned path, the obstacle avoidance module may re-route the device 100 to move around the obstacle or take an alternate path.

The occupancy map 2856 may be manually or automatically determined. Continuing the example, during a learning phase the user may take the device 100 on a tour of the environment, allowing the device 100 to generate the occupancy map 2856 and associated data, such as tags indicating designating a particular room, such as "kitchen" or "bedroom." In another example, during subsequent operation the device 100 may generate the occupancy map 2856 that is indicative of locations of obstacles such as chairs, doors, stairwells, and so forth as it moves unattended through the environment.

In some implementations, the occupancy map 2856 may include floor characterization data. The floor characterization data is indicative of one or more attributes of the floor at a particular location within the physical environment. During operation of the device 100, floor characterization data may be obtained. The floor characterization data may be utilized by one or more of safety module 2828, the autonomous navigation module 2834, the task module 2836, or other modules 2874. For example, the floor characterization data may be used to determine if an unsafe condition occurs such as a wet floor. In another example, the floor characterization data may be used by the autonomous navigation module 2834 to assist in the determination of the current location of the device 100 within the home. For example, if the autonomous navigation module 2834 determines that the device 100 is located in the dining room, but the floor characterization data indicates that the floors consistent with the living room, an error condition may be generated in which other techniques are used to determine the location of the device 100 or otherwise resolve the difference. For example, the device 100 may attempt to return to the docking station and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the device 100 may use speech synthesis to ask the user "what room is this?" during a training phase. The utterance of the user may be received by the microphone array and the audio data "this is the living room" may be processed and subsequently used to generate the location designator.

The autonomous navigation module 2834 may be used to move the device 100 from a first location to a second location within the physical environment. This movement may be responsive to a determination made by an onboard processor 2804, in response to a command received via one or more communication interfaces 2808 or a sensor 2816, and so forth. For example, an external server may send a command that is subsequently received using a network interface 2812. This command may direct the device 100 to proceed to a designated destination, such as "living room" or "dining room". The device 100 may then process this command, and use the autonomous navigation module 2834 to determine the directions and distances associated with reaching the specified destination.

The memory 2820 may store one or more task modules 2836. The task modules 2836 may comprise instructions that, when executed by the processor 2804 perform a task. For example, a video call module may be used to have the device 100 find a particular user and present a video call using the output devices 2818. In another example, a sentry task module 2836 may be used to have the device 100 travel throughout the environment and generate a report as to the presence of an unauthorized person. The task module 2836 comprises instructions that, when executed, provide one or more functions associated with a particular task. A task may have triggers with corresponding gestures.

Tasks may involve a single behavior. In one example, the task may comprise a security or sentry task in which the device 100 travels throughout the physical environment avoiding users and looking for events that exceed predetermined thresholds. In the sentry task, the trigger may be detection of a user within a threshold distance while the gesture comprises performing a "nodding" motion by tilting the display assembly 110 up and down.

In another example, the task may comprise a "follow me" feature in which the device 100 follows a user using a follow behavior. For example, the user may participate in a video call using the device 100. The camera on the mast 108 may be used to acquire video for transmission while the display is used to present video that is received. The device 100 may use data from one or more sensors 2816 to determine a location of the user relative to the device 100, and track and follow the user. In one implementation, computer vision techniques may be used to locate the user within image data acquired by the cameras. In another implementation, the user's voice may be detected by an array of microphones, and a direction to the voice with respect to the device 100 may be established. Other techniques may be utilized either alone or in combination to allow the device 100 to track a user, follow a user, or track and follow a user. The path of the device 100 as it follows the user may be based at least in part on one or more of constraint cost values. For example, while the device 100 is following the user down the hallway, the device 100 may stay to the right side of the hallway. In some situations, while following a user the device 100 may disregard some rules or may disregard the speed values for a particular area. For example, while following the user the device 100 may not slow down while passing a doorway.

In yet another example, the task may allow for the device 100 to be summoned to a particular location. The user may utter a voice command that is heard by a microphone on the device 100, a microphone in a smart phone, or another device with a microphone such as a network enabled speaker or television. While performing this task, the device 100 may utilize an avoid behavior until it reaches the particular location.

Alternatively, the user may issue a command using an app on a smartphone, wearable device, tablet, or other computing device. Given that the location of the device at which the command was obtained is known, the device 100 may be dispatched to that location. If the location is unknown, the device 100 may search for the particular user, utilizing an avoid behavior with respect to other users and an approach behavior for the particular user.

The user location module 2838 may provide user location data 2860 indicative of a location of a user. The user location module 2838 may be the sensor data 2852 from sensors 2816 on the device 100 or other sensors in the environment. The user location module 2838 processes the data to determine user location data 2860 indicative of a user location in the environment. The user location data 2860 may be indicative of coordinates within the environment that are indicative of a point associated with the user. For example, the user location data 2860 may indicate a centroid of the area occupied by the user with respect to a fixed coordinate system used to represent locations within the environment.

In some implementations the user location module 2838 may also process the data to determine user orientation data indicative of a user orientation in the environment. The user orientation data is indicative of a direction with respect to a fixed reference. For example, the user orientation data may be indicative of a heading as measured with respect to magnetic north, or an angle with respect to an axis of the fixed coordinate system. In some implementations the user orientation data may be indicative of an angle that extends from a reference point with respect to the user along a direction that is specified with respect to one or more features of the user. For example, the user orientation data may be based on a position of one or more of the user's head, shoulders, skeleton, feet, eyes, and so forth. In another example, the user orientation data may be based at least in part on a gaze direction of the user, that is indicative of which direction the user is looking. In one implementation the user orientation data may indicate the line that is perpendicular from a line extending through the shoulders of the user, and extending away from the user in a ventral direction. For example, if the user is standing and facing East, the user orientation data may indicate 90 degrees. In another implementation, the user orientation data may indicate the line that is perpendicular to a line extending through both eyes of the user and starts at a midpoint between the eyes.

In some implementations the user location module 2838 or other modules may provide user identification data 2864. The user identification data 2864 provides information that is indicative of a particular user. The user identification data 2864 may be indicative of login name, account name, serial number, and so forth. For example, the user identification data 2864 may indicate that a user has been identified as "Pat" or "User994481". Determination of the user identification data 2864 may be based on one or more of facial recognition, voice recognition, user input, biometric data, and so forth. For example, the user location module 2838 may utilize a facial recognition module that determines one or more features of a face that is present in an image acquired by a camera, and compares that information to previously stored enrollment data. If the features match within a threshold value, the user identification data 2864 may be determined. In another implementation the sound of the user's voice may be used to identify them.

During operation the device 100 may determine input data 2858. The input data 2858 may be based at least in part on sensor data 2852 provided by the sensors 2816 onboard the device 100. For example, the sensor data 2852 may comprise audio data indicative of an utterance by the user. The audio data may be processed to determine that the utterance is representative of a verbal command provided by the user. The input data 2858 may comprise information indicative of the command, parameters associated with it, and so forth. For example, the input data 2858 may indicate a command of a request for weather information while the parameter indicates the location about which the weather information is requested.

The gesture module 2840 is configured to determine the satisfaction of one or more trigger conditions 2866. When a trigger condition 2866 has been determined to be satisfied, the gesture data 2868 may be used to generate specific instructions that, when executed, cause the device 100 to perform the gesture. The gesture module 2840 may use as input the sensor data 2852, input data 2858, data associated with operation of the device 100, and so forth. For example, the gesture module 2840 may receive user location data 2860 that is based on sensor data 2852 indicating the user is within a threshold distance, satisfying a trigger condition 2866. The corresponding gesture data 2868 may be retrieved, and the instructions executed to perform a nodding behavior with the display assembly 110. In another example, the gesture module 2840 may determine that no task is in progress and interaction with the user is concluded, satisfying a trigger condition 2866. The corresponding gesture data 2868 may be retrieved, directing the device 100 to move the display assembly 110 so it is directed away from the user and then after some interval of time, moves away.

In some implementations the gesture module 2840 may be configured to limit performance of gestures to situations in which a user is within a threshold distance or within line of sight of the device 100. For example, if the threshold distance is 3 meters and the user is 2.5 meters from the device 100, a gesture may be performed. In another example, if no user is determined to be present, the gesture module 2840 may discontinue presentation of gestures by the device 100.

The speech processing module 2842 may be used to process utterances of the user. Microphones may acquire audio in the presence of the device 100 and may send raw audio data 2854 to an acoustic front end (AFE). The AFE may transform the raw audio data 2854 (for example, a single-channel, 16-bit audio stream sampled at 16 kHz), captured by the microphone, into audio feature vectors 2844 that may ultimately be used for processing by various components, such as a wakeword detection module 2846, speech recognition engine, or other components. The AFE may reduce noise in the raw audio data 2854. The AFE may also perform acoustic echo cancellation (AEC) or other operations to account for output audio data that may be sent to a speaker of the device 100 for output. For example, the device 100 may be playing music or other audio that is being received from a network in the form of output audio data. To avoid the output audio interfering with the device's ability to detect and process input audio, the AFE or other component may perform echo cancellation to remove the output audio data from the input raw audio data 2854, or other operations.

The AFE may divide the audio data into frames representing time intervals for which the AFE determines a number of values (i.e., features) representing qualities of the raw audio data 2854, along with a set of those values (i.e., a feature vector or audio feature vector) representing features/qualities of the raw audio data 2854 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 2854, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 2844 (or the raw audio data 2854) may be input into a wakeword detection module 2846 that is configured to detect keywords spoken in the audio. The wakeword detection module 2846 may use various techniques to determine whether audio data includes speech. Some embodiments may apply voice activity detection (VAD) techniques. Such techniques may determine whether speech is present in an audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other embodiments, the device 100 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in the audio data.

Once speech is detected in the audio received by the device 100 (or separately from speech detection), the device 100 may use the wakeword detection module 2846 to perform wakeword detection to determine when a user intends to speak a command to the device 100. This process may also be referred to as keyword detection, with the wakeword being a specific example of a keyword. Specifically, keyword detection is typically performed without performing linguistic analysis, textual analysis, or semantic analysis. Instead, incoming audio (or audio data 2848) is analyzed to determine if specific characteristics of the audio match preconfigured acoustic waveforms, audio signatures, or other data to determine if the incoming audio "matches" stored audio data corresponding to a keyword.

Thus, the wakeword detection module 2846 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without MINI involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local device 100 may "wake" and begin transmitting audio data 2848 (which may include one or more audio feature vectors 2844 or the raw audio data 2854) to one or more server(s) for speech processing. The audio data 2848 corresponding to audio obtained by the microphone may be sent to a server for routing to a recipient device or may be sent to the server for speech processing for interpretation of the included speech (either for purposes of enabling voice-communications and/or for purposes of executing a command in the speech). The audio data 2848 may include data corresponding to the wakeword, or the portion of the audio data 2848 corresponding to the wakeword may be removed by the local device 100 prior to sending.

The device 100 may connect to the network using one or more of the network interfaces 2812. One or more servers may provide various functions, such as ASR, natural language understanding (NLU), providing content such as audio or video to the device 100, and so forth.

The other modules 2874 may provide other functionality, such as object recognition, speech synthesis, user identification, and so forth. For example, an automated speech recognition (ASR) module may accept as input raw audio data 2854 or audio feature vectors 2844 and may produce as output a text string that is further processed and used to provide input, a task module 2836, and so forth. In one implementation, the text string may be sent via a network to a server for further processing. The device 100 may receive a response from the server and present output, perform an action, and so forth. For example, the raw audio data 2854 may include the user saying "robot go to the dining room". The audio data 2848 representative of this utterance may be sent to the server that returns commands directing the device 100 to the dining room of the home associated with the device 100.

The utterance may result in a response from the server that directs operation of other devices or services. For example, the user may say "robot wake me at seven tomorrow morning". The audio data 2848 may be sent to the server that determines the intent and generates commands to instruct a device attached to the network to play an alarm at 7:00 am the next day.

The other modules 2874 may comprise a speech synthesis module that is able to convert text data to human speech. For example, the speech synthesis module may be used by the device 100 to provide speech that a user is able to understand.

During operation the device 100 may access preference data 2870. The preference data 2870 may indicate preferences associated with a particular geographic region, physical address, user, and so forth. For example, a particular user may prefer a very slight change in the movement of the display assembly 110 while performing a nodding behavior, while another user may prefer a larger range of motion to improve visibility of the gesture. In other implementations, other preferences may be specified.

The data store 2824 may store other data 2872 such as localization settings, user identifier data, and so forth.

The device 100 may be configured to dock or connect to a docking station. The docking station may also be connected to the network. For example, the docking station may be configured to connect to the wireless local area network such that the docking station and the device 100 may communicate. The docking station may provide external power which the device 100 may use to charge the battery 2802.

The device 100 may access one or more servers via the network. For example, the device 100 may utilize a wake word detection module 2846 to determine if the user is addressing a request to the device 100. The wake word detection module 2846 may hear a specified word or phrase, transition the device 100 or portion thereof to the wake operating mode. Once in the wake mode, the device 100 may then transfer at least a portion of the audio spoken by the user to one or more servers for further processing. The servers may process the spoken audio and return to the device 100 data that may be subsequently used to operate the device 100.

The device 100 may also communicate with other devices. The other devices may include home automation controls, sensors, and so forth that are within the home or associated with operation of one or more devices in the home. For example, the other devices may include a doorbell camera, a garage door, a refrigerator, a washing machine, a network connected microphone, and so forth. In some implementations the other devices may include other devices 100, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 10:
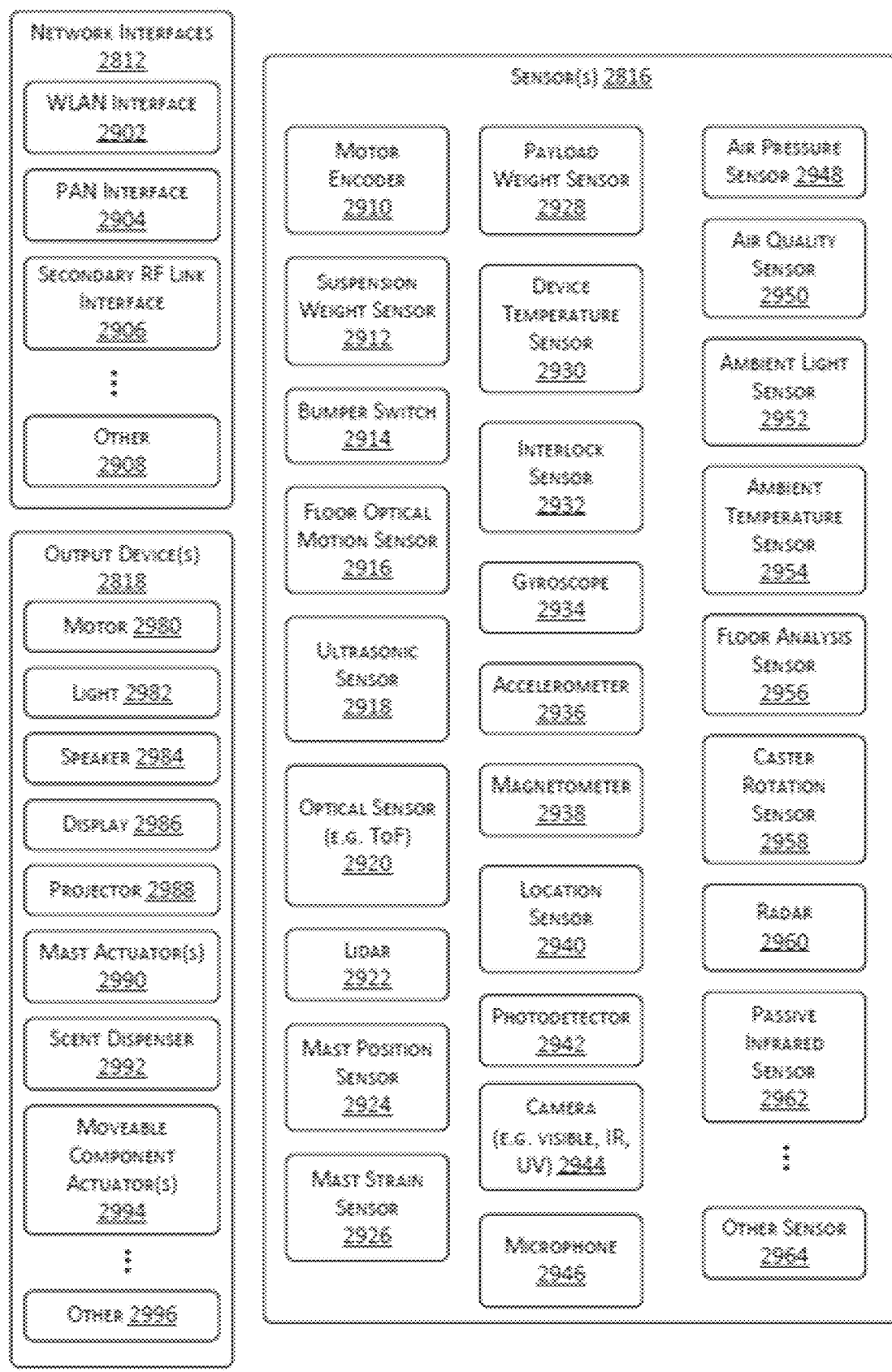
FIG. 10 is a block diagram of some components of the autonomous mobile device such as network interfaces, sensors, and output devices, according to some implementations.

FIG. 10 is a block diagram 2900 of some components of the autonomous mobile device 100 such as network interfaces 2812, sensors 2816, and output devices 2818, according to some implementations. The components illustrated here are provided by way of illustration and not necessarily as a limitation. For example, the device 100 may utilize a subset of the particular network interfaces 2812, output devices 2818, or sensors 2816 depicted here, or may utilize components not pictured. One or more of the sensors 2816, output devices 2818, or a combination thereof may be included on a moveable component that may be panned, tilted, rotated, or any combination thereof with respect to a chassis of the device 100. The chassis of the device 100 has a front and a back. The moveable component may be attached to, and extend away from, the front of the chassis. For example, the moveable component may be attached via a support structure to a front or leading edge of the chassis or a portion thereof.

The network interfaces 2812 may include one or more of a WLAN interface 2902, PAN interface 2904, secondary radio frequency (RF) link interface 2906, or other interface 2908. The WLAN interface 2902 may be compliant with at least a portion of the Wi-Fi specification. For example, the WLAN interface 2902 may be compliant with the least a portion of the IEEE 802.11 specification as promulgated by the Institute of Electrical and Electronics Engineers (IEEE). The PAN interface 2904 may be compliant with at least a portion of one or more of the Bluetooth, wireless USB, Z-Wave, ZigBee, or other standards. For example, the PAN interface 2904 may be compliant with the Bluetooth Low Energy (BLE) specification.

The secondary RF link interface 2906 may comprise a radio transmitter and receiver that operate at frequencies different from or using modulation different from the other interfaces. For example, the WLAN interface 2902 may utilize frequencies in the 2.4 GHz and 5 GHz Industrial Scientific and Medicine (ISM) bands, while the PAN interface 2904 may utilize the 2.4 GHz ISM bands. The secondary RF link interface 2906 may comprise a radio transmitter that operates in the 900 MHz ISM band, within a licensed band at another frequency, and so forth. The secondary RF link interface 2906 may be utilized to provide backup communication between the device 100 and other devices in the event that communication fails using one or more of the WLAN interface 2902 or the PAN interface 2904. For example, in the event the device 100 travels to an area within the physical environment that does not have Wi-Fi coverage, the device 100 may use the secondary RF link interface 2906 to communicate with another device such as a specialized access point, docking station, or other device 100.

The other 2908 network interfaces may include other equipment to send or receive data using other wavelengths or phenomena. For example, the other 2908 network interface may include an ultrasonic transceiver used to send data as ultrasonic sounds, a visible light system that communicates by modulating a visible light source such as a light-emitting diode, and so forth. In another example, the other 2908 network interface may comprise a wireless wide area network (WWAN) interface or a wireless cellular data network interface. Continuing the example, the other 2908 network interface may be compliant with at least a portion of the 3G, 4G, 5G, LTE, or other standards. The device 100 may include one or more of the following sensors 2816. The sensors 2816 depicted here are provided by way of illustration and not necessarily as a limitation. It is understood other sensors 2816 may be included or utilized by the device 100, while some sensors 2816 may be omitted in some configurations.

A motor encoder 2910 provides information indicative of the rotation or linear extension of a motor. The motor may comprise a rotary motor, or a linear actuator. In some implementations, the motor encoder 2910 may comprise a separate assembly such as a photodiode and encoder wheel that is affixed to the motor. In other implementations, the motor encoder 2910 may comprise circuitry configured to drive the motor. For example, the autonomous navigation module 2834 may utilize the data from the motor encoder 2910 to estimate a distance traveled.

A suspension weight sensor 2912 provides information indicative of the weight of the device 100 on the suspension system for one or more of the main wheels 302 or the caster wheel 406. For example, the suspension weight sensor 2912 may comprise a switch, strain gauge, load cell, photodetector, or other sensing element that is used to determine whether weight is applied to a particular wheel, or whether weight has been removed from the wheel. In some implementations, the suspension weight sensor 2912 may provide binary data such as a "1" value indicating that there is a weight applied to the wheel, while a "0" value indicates that there is no weight applied to the main wheel 302. In other implementations, the suspension weight sensor 2912 may provide an indication such as so many kilograms of force or newtons of force. The suspension weight sensor 2912 may be affixed to one or more of the main wheels 302 or the caster wheel 406. In some situations, the safety module 2828 may use data from the suspension weight sensor 2912 to determine whether or not to inhibit operation of one or more of the motors. For example, if the suspension weight sensor 2912 indicates no weight on the suspension, the implication is that the device 100 is no longer resting on its wheels, and thus operation of the motors may be inhibited. In another example, if the suspension weight sensor 2912 indicates weight that exceeds a threshold value, the implication is that something heavy is resting on the device 100 and thus operation of the motors may be inhibited.

One or more bumper switches 2914 provide an indication of physical contact between a bumper and another member that is in mechanical contact with the bumper switch 2914. The safety module 2828 utilizes sensor data 2852 obtained by the bumper switches 2914 to modify the operation of the device 100. For example, if the bumper switch 2914 associated with the front of the device 100 is triggered, the safety module 2828 may drive the device 100 backwards.

A floor optical motion sensor (FOMS) 2916 provides information indicative of motions of the device 100 relative to the floor or other surface underneath the device 100. In one implementation, the FOMS 2916 may comprise a light source such as light-emitting diode (LED), an array of photodiodes, and so forth. In some implementations, the FOMS 2916 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 2916 may provide other information, such as data indicative of a pattern present on the floor, composition of the floor, color of the floor, and so forth. For example, the FOMS 2916 may utilize an optoelectronic sensor that may detect different colors or shades of gray, and this data may be used to generate floor characterization data.

An ultrasonic sensor 2918 utilizes sounds in excess of 20 kHz to determine a distance from the sensor 2816 to an object. The ultrasonic sensor 2918 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 2918 may provide information indicative of a presence of an object, distance to the object, and so forth. Two or more ultrasonic sensors 2918 can be utilized in conjunction with one another to determine a location within a two-dimensional plane of the object.

In some implementations, the ultrasonic sensor 2918 or portion thereof may be used to provide other functionality. For example, the emitter of the ultrasonic sensor 2918 may be used to transmit data and the detector may be used to receive data transmitted that is ultrasonic sound. In another example, the emitter of an ultrasonic sensor 2918 may be set to a particular frequency and used to generate a particular waveform such as a sawtooth pattern to provide a signal that is audible to an animal, such as a dog or a cat.

An optical sensor 2920 may provide sensor data 2852 indicative of one or more of a presence or absence of an object, a distance to the object, or characteristics of the object. The optical sensor 2920 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 2920 may utilize one or more sensing elements. For example, the optical sensor 2920 may comprise a 4×4 array of light sensing elements. Each individual sensing element may be associated with a field of view (FOV) that is directed in a different way. For example, the optical sensor 2920 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 2816 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 2920 may operate as a depth camera, providing a two-dimensional image of a scene, as well as data that indicates a distance to each pixel.

Data from the optical sensors 2920 may be utilized for collision avoidance. For example, safety module 2828 and the autonomous navigation module 2834 may utilize the sensor data 2852 indicative of the distance to an object in order to prevent a collision with that object.

Multiple optical sensors 2920 may be operated such that their FOV overlap at least partially. To minimize or eliminate interference, the optical sensors 2920 may selectively control one or more of the timing, modulation, or frequency of the light emitted. For example, a first optical sensor 2920 may emit light modulated at 290 kHz while a second optical sensor 2920 emits light modulated at 293 kHz.

A lidar 2922 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 2852 may be generated that is indicative of the presence of objects and the relative positions, shapes, and so forth is visible to the lidar 2922. Data from the lidar 2922 may be used by various modules. For example, the autonomous navigation module 2834 may utilize point cloud data generated by the lidar 2922 for localization of the device 100 within the physical environment.

A mast position sensor 2924 provides information indicative of a position of the mast. For example, the mast position sensor 2924 may comprise limit switches associated with the mast extension mechanism that indicate whether the mast 108 is an extended or retracted position. In other implementations, the mast position sensor 2924 may comprise an optical code on at least a portion of the mast 108 that is then interrogated by an optical emitter and a photodetector to determine the distance which the mast 108 is extended. In another implementation, the mast position sensor 2924 may comprise an encoder wheel that is attached to a mast motor that is used to raise or lower the mast 108. The mast position sensor 2924 may provide data to the safety module 2828. For example, if the device 100 is preparing to move, data from the mast position sensor 2924 may be checked to determine if the mast 108 is retracted, and if not, the mast 108 may be retracted prior to beginning movement.

A mast strain sensor 2926 provides information indicative of a strain on the mast 108 with respect to the remainder of the device 100. For example, the mast strain sensor 2926 may comprise strain gauge or load cell that measures a side-load applied to the mast 108 or a weight on the mast or downward pressure on the mast 108. The safety module 2828 may utilize sensor data 2852 obtained by the mast strain sensor 2926. For example, if the strain applied to the mast exceeds a threshold amount, the safety module 2828 may direct an audible and visible alarm to be presented by the device 100.

A payload weight sensor 2928 provides information indicative of the weight associated with the modular payload bay 104. The payload weight sensor 2928 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 2928 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 2928 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 2828 may utilize the payload weight sensor 2928 to determine if the modular payload bay 104 has been overloaded. If so, an alert or notification may be issued.

One or more device temperature sensors 2930 may be utilized by the device 100. The device temperature sensors 2930 provide temperature data of one or more components within the device 100. For example, a device temperature sensor 2930 may indicate a temperature of one or more of the batteries 2802, one or more motors, and so forth. In the event the temperature exceeds a threshold value, the component associated with that device temperature sensor 2930 may be shut down.

One or more interlock sensors 2932 may provide data to the safety module 2828 or other circuitry that prevents the device 100 from operating in an unsafe condition. For example, the interlock sensors 2932 may comprise switches that indicate whether an access panel is open. The interlock sensors 2932 may be configured to inhibit operation of the device 100 until the interlock switch indicates a safe condition is present.

A gyroscope 2934 may provide information indicative of rotation of an object affixed thereto. For example, gyroscope 2934 may generate sensor data 2852 that is indicative of a change in orientation of the device 100 or portion thereof.

An accelerometer 2936 provides information indicative of a direction and magnitude of an imposed acceleration. Data such as rate of change, determination of changes in direction, speed, and so forth may be determined using the accelerometer 2936. The accelerometer 2936 may comprise mechanical, optical, micro-electromechanical, or devices. For example, the gyroscope 2934 in the accelerometer 2936 may comprise a prepackaged solid-state inertial measurement unit (IMU) that provides multiple axis gyroscopes 2934 and accelerometers 2936.

A magnetometer 2938 may be used to determine an orientation by measuring ambient magnetic fields, such as the terrestrial magnetic field. For example, the magnetometer 2938 may comprise a Hall effect transistor that provides output compass data indicative of a magnetic heading.

The device 100 may include one or more locations sensors 2940. The location sensors 2940 may comprise an optical, radio, or other navigational system such as a global positioning system (GPS) receiver. For indoor operation, the location sensors 2940 may comprise indoor position systems, such as using Wi-Fi Positioning Systems (WPS). The location sensors 2940 may provide information indicative of a relative location, such as "living room" or an absolute location such as particular coordinates indicative of latitude and longitude, or displacement with respect to a predefined origin.

A photodetector 2942 provides sensor data 2852 indicative of impinging light. For example, the photodetector 2942 may provide data indicative of a color, intensity, duration, and so forth.

A camera 2944 generates sensor data 2852 indicative of one or more images. The camera 2944 may be configured to detect light in one or more wavelengths including, but not limited to, terahertz, infrared, visible, ultraviolet, and so forth. For example, an infrared camera 2944 may be sensitive to wavelengths between approximately 700 nanometers and 1 millimeter. The camera 2944 may comprise charge coupled devices (CCD), complementary metal oxide semiconductor (CMOS) devices, microbolometers, and so forth. The device 100 may use image data acquired by the camera 2944 for object recognition, navigation, collision avoidance, user communication, and so forth. For example, a pair of cameras 2944 sensitive to infrared light may be mounted on the front of the device 100 to provide binocular stereo vision, with the sensor data 2852 comprising images being sent to the autonomous navigation module 2834. In another example, the camera 2944 may comprise a 10 megapixel or greater camera that is used for videoconferencing or for acquiring pictures for the user.

The camera 2944 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 2944, particularly those associated with navigation or autonomous operation, may utilize a global shutter. In other implementations, the camera(s) 2944 providing images for use by the autonomous navigation module 2834 may be acquired using a rolling shutter and subsequently may be processed to mitigate image artifacts.

One or more microphones 2946 may be configured to acquire information indicative of sound present in the physical environment. In some implementations, arrays of microphones 2946 may be used. These arrays may implement beamforming techniques to provide for directionality of gain. The device 100 may use the one or more microphones 2946 to acquire information from acoustic tags, accept voice input from users, determine ambient noise level, for voice communication with another user or system, and so forth.

An air pressure sensor 2948 may provide information indicative of an ambient atmospheric pressure or changes in ambient atmospheric pressure. For example, the air pressure sensor 2948 may provide information indicative of changes in air pressure due to opening and closing of doors, weather events, and so forth.

An air quality sensor 2950 may provide information indicative of one or more attributes of the ambient atmosphere. For example, the air quality sensor 2950 may include one or more chemical sensing elements to detect the presence of carbon monoxide, carbon dioxide, ozone, and so forth. In another example, the air quality sensor 2950 may comprise one or more elements to detect particulate matter in the air, such as the photoelectric detector, ionization chamber, and so forth. In another example, the air quality sensor 2950 may include hygrometer that provides information indicative of relative humidity.

An ambient light sensor 2952 may comprise one or more photodetector's or other light-sensitive elements that are used to determine one or more of the color, intensity, duration of ambient lighting around the device 100.

An ambient temperature sensor 2954 provides information indicative of the temperature of the ambient environment proximate to the device 100. In some implementations, an infrared temperature sensor may be utilized to determine the temperature of another object at a distance.

A floor analysis sensor 2956 may include one or more components that are used to generate at least a portion of the floor characterization data. In one implementation, floor analysis sensor 2956 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 2956 may be used by one or more of the safety module 2828, the autonomous navigation module 2834, the task module 2836, and so forth. For example, if the floor analysis sensor 2956 determines that the floor is wet, the safety module 2828 may decrease the speed of the device 100 and generate a notification alerting the user.

The floor analysis sensor 2956 may include other components as well. For example, coefficient of friction sensor may comprise a probe that comes into contact with the surface and determines the coefficient of friction between the probe and the floor.

A caster rotation sensor 2958 provides data indicative of one or more of a direction of orientation, angular velocity, linear speed of the caster wheel 406, and so forth. For example, the caster rotation sensor 2958 may comprise an optical encoder and corresponding target that is able to determine that the caster assembly 402 transitioned from an angle of 0° at a first time to 49° at a second time.

The sensors 2816 may include a radar 2960. The radar 2960 may be used to provide information as to a distance, lateral position, and so forth, to an object.

The sensors 2816 may include a passive infrared (PIR) sensor 2962. The PIR 2962 may be used to detect the presence of people, pets, hotspots, and so forth. For example, the PIR 2962 may be configured to detect infrared radiation with wavelengths between 8 and 14 micrometers.

The device 100 may include other sensors 2964 as well. For example, a capacitive proximity sensor may be used to provide proximity data to adjacent objects. Other sensors 2964 may include radio frequency identification (RFID) readers, near field communication (NFC) systems, coded aperture camera, and so forth. For example, NFC tags may be placed at various points within the physical environment to provide landmarks for the autonomous navigation module 2834. One or more touch sensors may be utilized to determine contact with a user or other objects.

The device 100 may include one or more output devices 2818. A motor 2980 may be used to provide linear or rotary motion. A light 2982 may be used to emit photons. A speaker 2984 may be used to emit sound. A display 2986 may comprise one or more of a liquid crystal display, light emitting diode display, electrophoretic display, cholesterol display, interferometric display, and so forth. The display 2986 may be used to present visible information such as graphics, pictures, text, and so forth. In some implementations, the display 2986 may comprise a touchscreen that combines a touch sensor and a display 2986.

In some implementations, the device 100 may be equipped with a projector 2988. The projector 2988 may be able to project an image on the surface, such as the floor, wall, ceiling, and so forth.

One or more mast actuators 2990 may comprise one or more of a motor, linear actuator, pneumatic device, hydraulic device, and so forth. An actuator controller may be used to provide a signal or other input that operates one or more of the mast actuators 2990 to produce movement of the mast 108. For example, the lift assembly 508 may include the mast actuators 2990 that are used to raise or lower at least a portion of the mast 108.

A scent dispenser 2992 may be used to emit one or more smells. For example, the scent dispenser 2992 may comprise a plurality of different scented liquids that may be evaporated or vaporized in a controlled fashion to release predetermined amounts of each.

One or more moveable component actuators 2994 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 2994 to produce movement of the moveable component.

In other implementations, other 2996 output devices may be utilized. For example, the device 100 may include a haptic output device that provides output that produces particular touch sensations to the user. Continuing the example, a motor 2980 with an eccentric weight may be used to create a buzz or vibration to allow the device 100 to simulate the purr of a cat.

The apparatus described in this disclosure may be used in other situations. For example, a stationary device may use the pan and tilt assembly to pan and tilt a component such as a display 2986, camera 2944, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An autonomous mobile device comprising:
    a robot comprising:
        a support member;
        a main body; and
        a moveable assembly coupled to the main body and coupled to the support member, wherein the moveable assembly comprises a motor assembly that rotates the support member about a first axis to tilt the support member and rotates the support member about a second axis to pan the support member; and
    an antenna disposed on the support member; and
    a printed circuit board (PCB) disposed in the main body, wherein the PCB comprises a receiver coupled to the antenna, a processing device, a memory device, and a component that is a noise source when operating, wherein the memory device stores a dipole moment model, wherein the dipole moment model comprises a first angle between the noise source and the antenna and a corresponding first radio frequency interference (RFI) value indicating the noise at the antenna caused by the noise source when oriented at the first angle, wherein the processing device is to execute a dynamic noise cancelation engine that performs the following:
        determines that the component is operating;
        determines a current angle between the noise source and the antenna, wherein noise dipole moment model comprises a second RFI value indicating the noise at the antenna, caused by the noise source when oriented at the current angle, is higher than the first angle;
        determines an adjustment amount that the noise source, the antenna, or both need to move to orient the noise source at the first angle; and
        causes the motor assembly to at least one of rotate the support member about the first axis to tilt the support member or rotate the support member about the second axis to pan the support member by the adjustment amount.

2. The autonomous mobile device of claim 1, further comprising:
    a display coupled to the support member, wherein the moveable assembly further comprises an extensible mast coupled between the support member and the main body, wherein the motor assembly translates the support member relative to the main body, wherein the dipole moment model indicates a first height of the antenna relative to the noise source and the first angle between the noise source and the antenna for which the RFI is less than other heights and corresponding angles between the noise source and the antenna, wherein the dynamic noise cancelation engine further performs the following:
        determines a current height between the noise source and the antenna;
        determines a second adjustment amount to the current height to move the antenna to the first height; and
        causes the motor assembly to translate the extensible mast by the second adjustment amount to the first height.

3. The autonomous mobile device of claim 1, wherein the robot further comprises:
    a plurality of wheels to propel the autonomous mobile device along a surface; and
    an extensible mast coupled between the support member and the main body, wherein the motor assembly translates the support member relative to the main body, wherein the dipole moment model indicates a first location of the antenna relative to the noise source and the first angle between the noise source and the antenna for which the RFI is less than other locations and angles between the noise source and the antenna, wherein the dynamic noise cancelation engine further performs the following:
        determines a current location of the noise source;
        determines a second adjustment amount to the current location to move the antenna to the first location; and
        causes the motor assembly to at least one of rotate the support member about the first axis to tilt the support member, rotate the support member about the second axis to pan the support member, or translate the extensible mast by the adjustment amount to the first location.

4. An electronic device comprising:
    a support member;
    a base assembly;
    a moveable assembly coupled to the base assembly and coupled to the support member, wherein the moveable assembly comprises a first motor to move the moveable assembly about a first degree of freedom and a second motor to move the moveable assembly about a second degree of freedom;

a circuit board disposed within the base assembly, wherein the circuit board comprises a receiver, a processing device, and a memory device;

an antenna disposed on the support member and coupled to the receiver; and a component that is a noise source when operating, wherein the memory device stores noise profile data of the component, wherein the noise profile data indicates that radiated energy received at the antenna from the noise source being at a first angle is less than radiated energy received at the antenna from the noise source being at a second angle, wherein the processing device is to:

determine that the component is operating;

determine a current position of the antenna relative to the component;

determine a current angle between the component and the antenna;

determine a difference value between the current angle and the first angle; and cause the moveable assembly to move at least one of the antenna or the base assembly according to the difference value.

5. The electronic device of claim 4, further comprising a robot comprising the support member, the base assembly, and the moveable assembly, wherein the moveable assembly comprises a robotic arm comprising at least two degrees of freedom to move the support member relative to the base assembly.

6. The electronic device of claim 4, further comprises:

a plurality of wheels to propel the electronic device along a surface; and an extensible mast coupled between the support member and the base assembly, wherein the moveable assembly translates the support member relative to the base assembly.

7. The electronic device of claim 4, further comprises a microcontroller coupled to the processing device, the first motor, and the second motor, wherein the processing device is to output the difference value to the microcontroller, wherein the microcontroller moves at least one of the antenna or the base assembly by the difference value.

8. The electronic device of claim 4, wherein the noise profile data of the component comprises a dipole moment model that indicates a first dipole moment magnitude value corresponding to the first angle between the component and the antenna, wherein the first dipole moment magnitude value is less than a second dipole moment magnitude value corresponding to the current angle.

9. The electronic device of claim 4, wherein the noise profile data of the component indicates that the first angle has a radio frequency interference (RFI) value that is less than RFI values for other angles of the noise source with respect to the antenna.

10. The electronic device of claim 4, wherein the component is at least one of a connector, an integrated circuit, a conductive trace on the circuit board, a transmission line on the circuit board, an interconnect disposed on the circuit board, a cable, a flexible printed circuit board (PCB), a camera, or a peripheral device.

11. The electronic device of claim 4, wherein the first motor is to rotate the support member about a first axis to tilt the support member in the first degree of freedom to cause the moveable assembly to move at least one of the antenna or the base assembly according to the difference value, wherein the second motor is to rotate the support member about a second axis to pan the support member in the second degree of freedom to cause the moveable assembly to move at least one of the antenna or the base assembly according to the difference value.

12. The electronic device of claim 4, wherein the first motor is to rotate the support member about a first axis to tilt the support member in the first degree of freedom to cause the moveable assembly to move at least one of the antenna or the base assembly according to the difference value, wherein the second motor is to rotate the support member about a second axis to pan the support member in the second degree of freedom to cause the moveable assembly to move at least one of the antenna or the base assembly according to the difference value, and wherein the moveable assembly further comprises:

an extensible mast coupled between the support member and the base assembly; and a third motor to translate the extensible mast in a third degree of freedom to cause the moveable assembly to move the antenna relative to the base assembly according to the difference value.

13. A robotic device comprising:

a robot comprising:

a support member; and a moveable assembly having a first rotational degree of freedom and a second rotational degree of freedom and a translational degree of freedom; and a noise component;

an antenna disposed on the support member;

a circuit board comprising a receiver and a processing device, wherein the processing device is to:

determine that the noise component is radiating electromagnetic energy in a radiation pattern known to the processing device, wherein the processing device determines, from the radiation pattern, a first location and a first orientation between the noise component and the antenna for which radio frequency interference (RFI) at the receiver is less than other locations and orientations between the noise component and the antenna;

determine a current location and a current orientation of the noise component relative to the antenna;

determine a difference value to the current location, the current orientation, or both to correspond to the first location and first orientation; and cause the moveable assembly to move at least one of the antenna or the noise component according to the difference value.

14. The robotic device of claim 13, wherein the robot further comprises:

a base assembly comprising a plurality of motorized wheels;

a first motor to rotate the support member about the first rotational degree of freedom;

a second motor to rotate the support member about the second rotational degree of freedom; and a third motor to translate the support member in the translational degree of freedom.

15. The robotic device of claim 14, wherein the moveable assembly comprises a tower with an extensible mast coupled to the base assembly and the support member, wherein the extensible mast is configurable to translate the support member in the translational degree of freedom.

16. The robotic device of claim 15, further comprising a display disposed on the support member, wherein the processing device is cause the moveable assembly to move only the noise component according to the difference value while maintaining at least an orientation of the display.

17. The robotic device of claim 15, wherein the processing device is to cause the moveable assembly to move only the noise component according to the difference value while maintaining at least an orientation of the antenna.

18. The robotic device of claim 15, wherein the processing device is cause the moveable assembly to move only the antenna according to the difference value while maintaining at least the current location of the noise component.

19. The robotic device of claim 13, wherein the moveable assembly comprises a robotic arm having at least the first rotational degree of freedom and the second rotational degree of freedom.

20. The robotic device of claim 19, further comprising a display disposed on the support member, wherein the processing device is cause the robotic arm to maintain a current location and a current orientation of the display while moving only the noise component by the difference value.

21. A method of operating an electronic device, the method comprising:
   determining a current position of an antenna of the electronic device relative to a component in the electronic device, the component being a noise source for a receiver that is coupled to the antenna;
   determining a current angle between the component and the antenna;
   determining a difference value between the current angle and a first angle using noise profile data of the component, wherein the noise profile data indicates that first radiated energy that is received at the antenna from the component being at the first angle is less than second radiated energy that is received at the antenna from the component being at the current angle; and
   causing a moveable assembly to move at least one of the antenna or the component to a position corresponding to the first angle.

22. The method of claim 21, further comprising determining that the component is operating.

* * * * *